US012646275B2

(12) United States Patent
Cardwell et al.

(10) Patent No.: US 12,646,275 B2
(45) Date of Patent: Jun. 2, 2026

(54) THREE-DIMENSIONAL OBJECT MANIPULATION CONTROL

(71) Applicant: Adobe Inc., San Jose, CA (US)

(72) Inventors: David McKinley Cardwell, Toronto (CA); Kowsheek Mahmood, Concord (CA); Christophe Darphin, Lyons (FR); Salvador German Soto Gutierrez, Toronto (CA)

(73) Assignee: Adobe Inc., San Jose, CA (US)

( * ) Notice: Subject to any disclaimer, the term of this patent is extended or adjusted under 35 U.S.C. 154(b) by 224 days.

(21) Appl. No.: 18/528,064

(22) Filed: Dec. 4, 2023

(65) Prior Publication Data

US 2025/0118040 A1 Apr. 10, 2025

Related U.S. Application Data

(60) Provisional application No. 63/588,822, filed on Oct. 9, 2023.

(51) Int. Cl.
*G06T 19/20* (2011.01)
*G06F 3/04815* (2022.01)
(Continued)

(52) U.S. Cl.
CPC .......... *G06T 19/20* (2013.01); *G06F 3/04815* (2013.01); *G06F 3/04845* (2013.01);
(Continued)

(58) Field of Classification Search
CPC ..... G06T 19/20; G06T 19/00; G06T 2200/24; G06T 2219/2004; G06T 2219/2012;
(Continued)

(56) References Cited

U.S. PATENT DOCUMENTS 9,460,542 B2 10/2016 Miller et al.
11,394,945 B2 7/2022 Mecca et al.
(Continued)

OTHER PUBLICATIONS

"Non-Final Office Action", U.S. Appl. No. 18/527,993, filed Jun. 30, 2025, 31 pages.
(Continued)

*Primary Examiner* — Chong Wu
(74) *Attorney, Agent, or Firm* — FIG. 1 Patents

(57) ABSTRACT

Three-dimensional object edit and visualization techniques and systems are described. In a first example, a content navigation control is implemented by a content editing system to aid navigation through a history of how a three-dimensional environment and a three-dimensional object included in the environment is created. In a second example, the content editing system is configured to streamline placement of a three-dimensional object within a three-dimensional environment. The content editing system, for instance, generates a manipulation visualization in support of corresponding editing operations to act as a guide, e.g., as an alignment guide or an option guide. In a third example, the content editing system implements a shadow control that is usable as part of an editing and as a visualization to control rendering of illumination within a three-dimensional environment.

20 Claims, 18 Drawing Sheets
(5 of 18 Drawing Sheet(s) Filed in Color)

(51) Int. Cl.
  *G06F 3/04845*    (2022.01)
  *G06F 3/04847*    (2022.01)
  *G06T 19/00*     (2011.01)

(52) U.S. Cl.
  CPC .......... *G06F 3/04847* (2013.01); *G06T 19/00*
        (2013.01); *G06T 2200/24* (2013.01)

(58) Field of Classification Search
  CPC ..... G06T 2219/2016; G06T 2219/2021; G06F
        3/04815; G06F 3/04845; G06F 3/04847
  See application file for complete search history.

(56) References Cited

U.S. PATENT DOCUMENTS

| | | |
|---|---|---|
| 12,561,931 B2 | 2/2026 | Cardwell et al. |
| 2012/0331061 A1 | 12/2012 | Lininger |
| 2016/0239181 A1* | 8/2016 | You ...................... G06T 19/003 |
| 2016/0283093 A1 | 9/2016 | Burns |
| 2022/0326837 A1 | 10/2022 | Dessero et al. |
| 2023/0350539 A1 | 11/2023 | Owen et al. |
| 2024/0029377 A1 | 1/2024 | O'Leary et al. |
| 2025/0078420 A1* | 3/2025 | Dessero ................. G06T 19/20 |
| 2025/0103141 A1* | 3/2025 | Bae ......................... G06T 11/00 |
| 2025/0118026 A1 | 4/2025 | Cardwel et al. |

OTHER PUBLICATIONS

Non-Final Office Action issued in U.S. Appl. No. 18/583,128, mailed Dec. 5, 2025, 15 pages.

\* cited by examiner

100

300

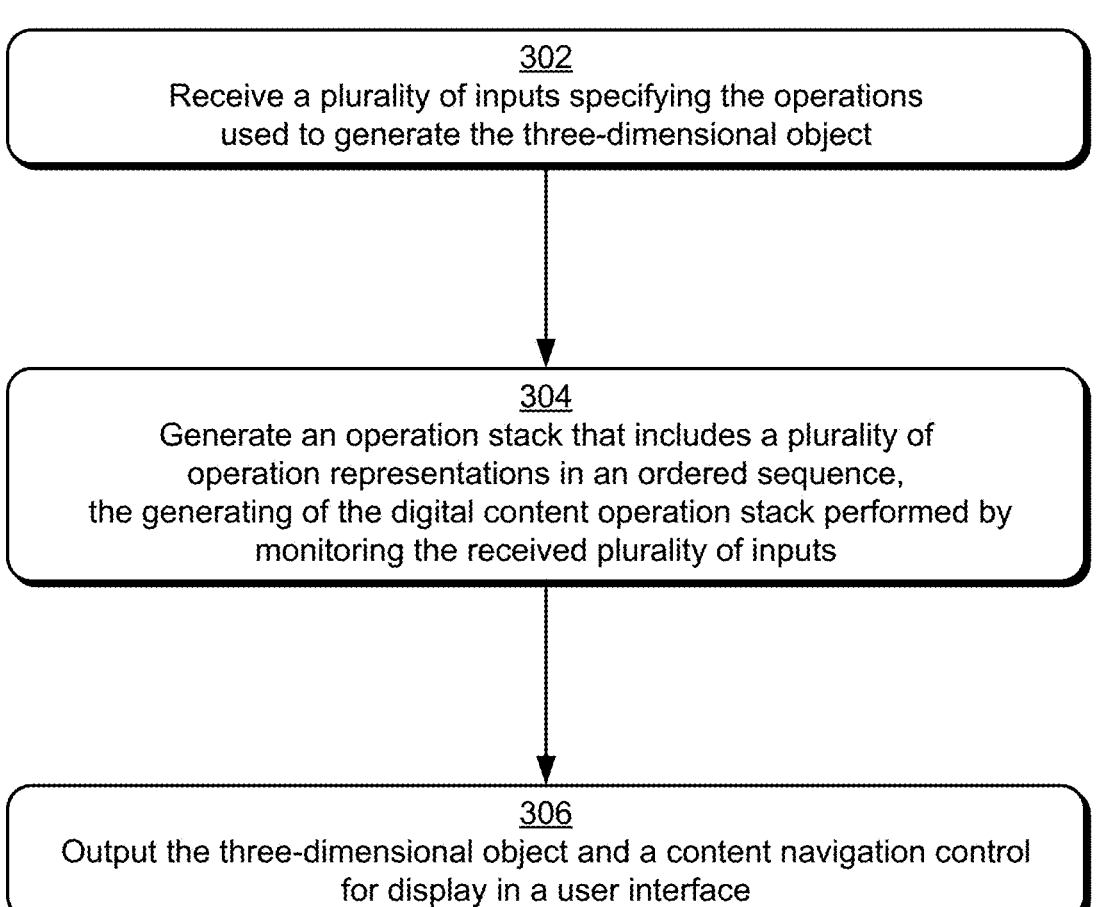

302
Receive a plurality of inputs specifying the operations
used to generate the three-dimensional object 304
Generate an operation stack that includes a plurality of
operation representations in an ordered sequence,
the generating of the digital content operation stack performed by
monitoring the received plurality of inputs 306
Output the three-dimensional object and a content navigation control
for display in a user interface

Figure 4:
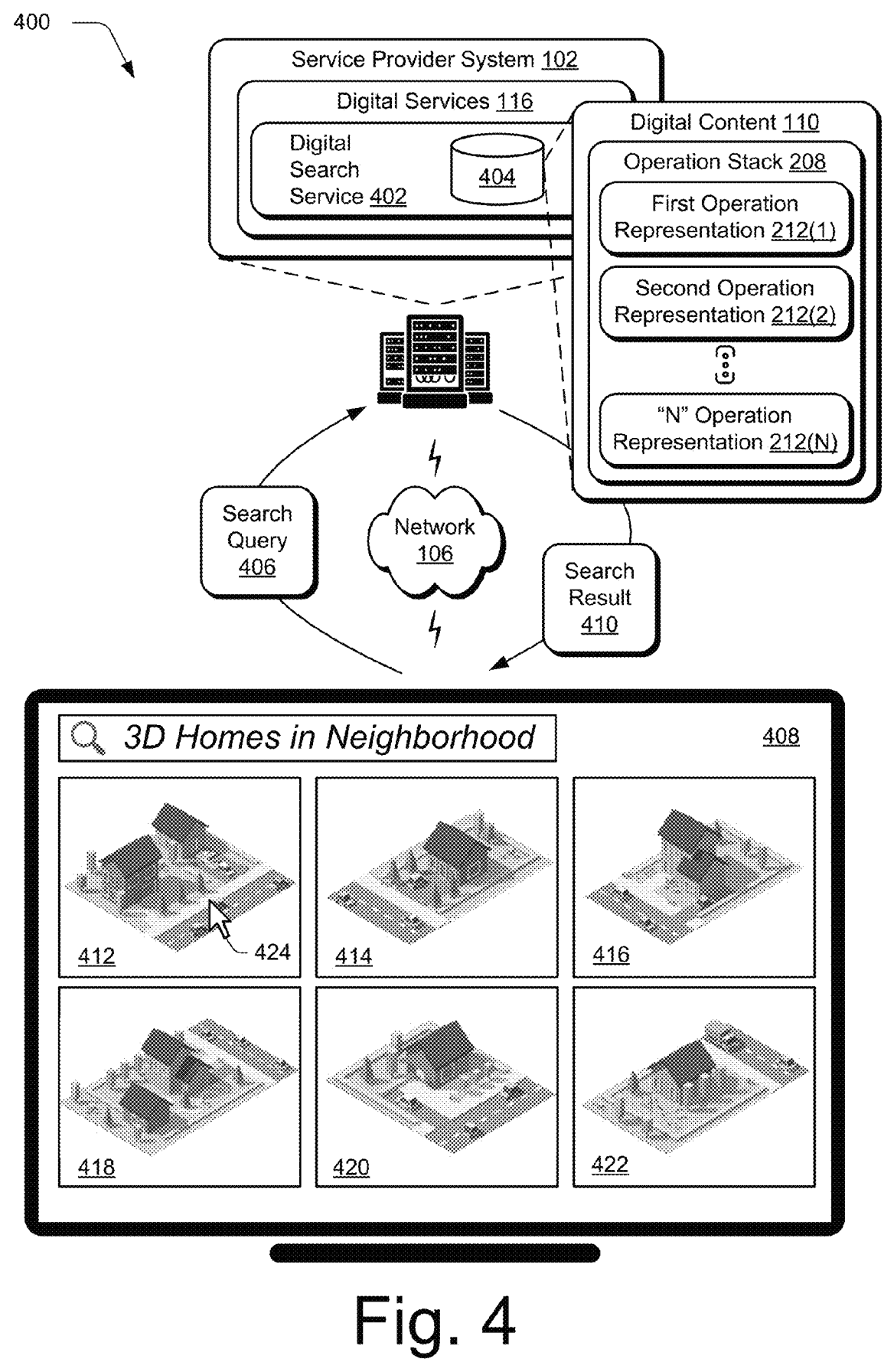

Service Provider System 102

Digital Services 116

Digital Search Service 402    404

Digital Content 110

Operation Stack 208

First Operation Representation 212(1)

Second Operation Representation 212(2)

"N" Operation Representation 212(N)

Search Query 406

Network 106

Search Result 410

🔍 *3D Homes in Neighborhood*     408

500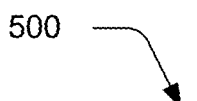

> 502
> Output a plurality of representations for display in a user interface, the plurality of representations corresponding, respectively, to digital content having a three-dimensional object > 504
> Receive an input selecting a representation from the plurality of representations > 506
> Obtaining the digital content corresponding to the selected representation, the digital content having an operation stack that includes a plurality of operation representations in an ordered sequence used to generate a respective three-dimensional object > 508
> Control navigation through a plurality of versions of the respective three-dimensional object corresponding to respective locations within the ordered sequence of the operation stack using a content navigation control

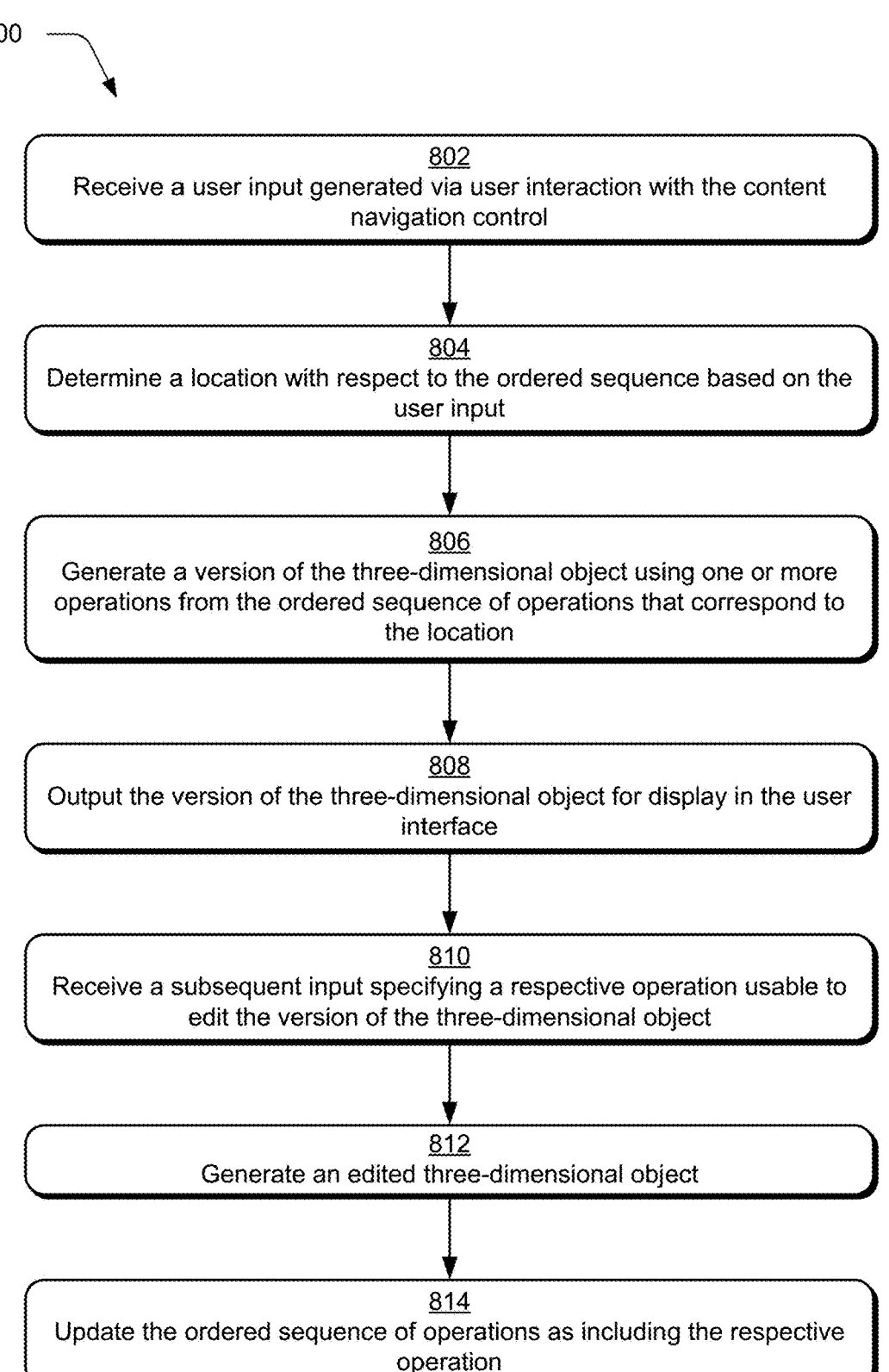

802
Receive a user input generated via user interaction with the content navigation control

804
Determine a location with respect to the ordered sequence based on the user input

806
Generate a version of the three-dimensional object using one or more operations from the ordered sequence of operations that correspond to the location

808
Output the version of the three-dimensional object for display in the user interface

810
Receive a subsequent input specifying a respective operation usable to edit the version of the three-dimensional object

812
Generate an edited three-dimensional object

814
Update the ordered sequence of operations as including the respective operation

Figure 12:
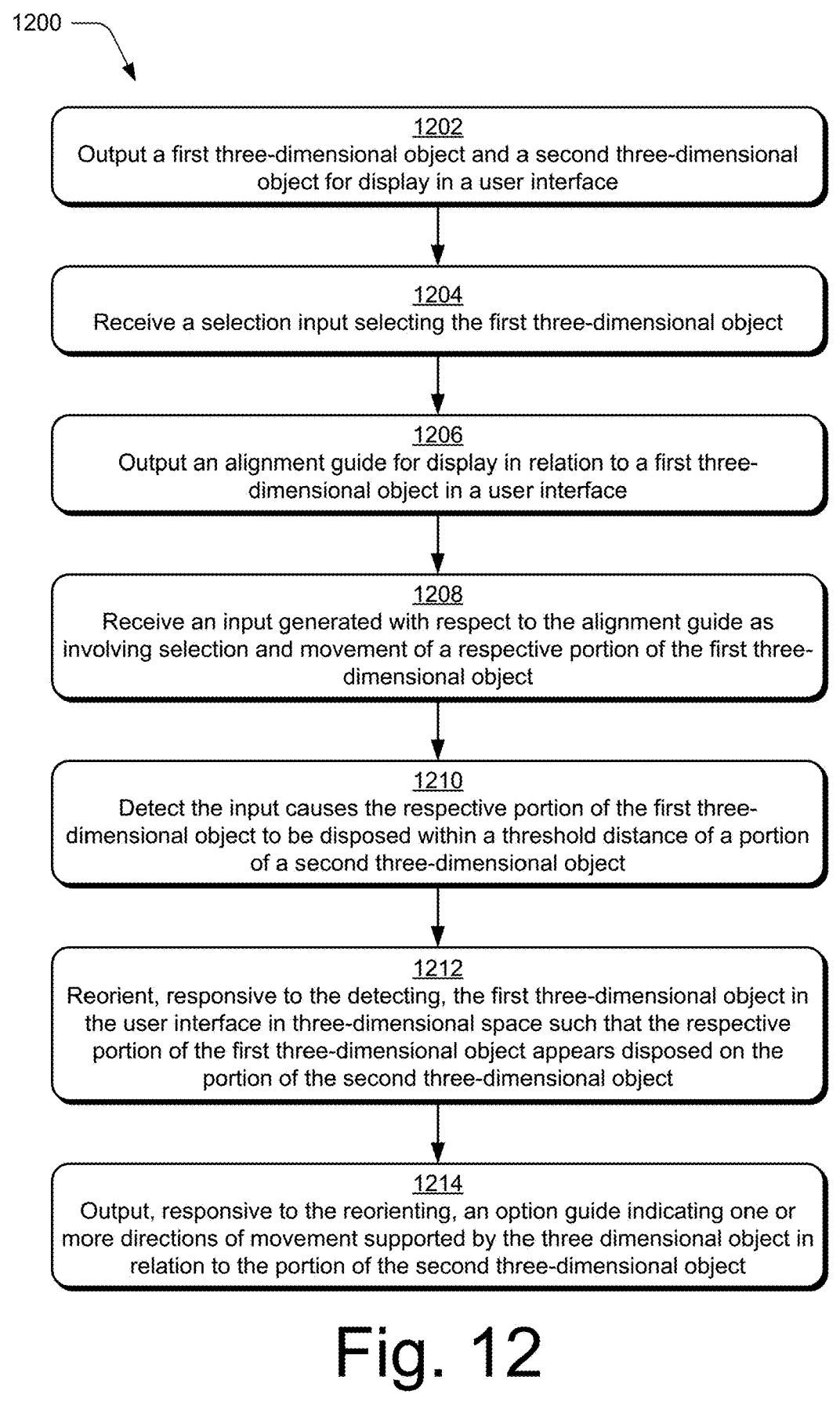

```
┌────────────────────────────────────────────────────────────┐
│                          1202                              │
│   Output a first three-dimensional object and a second     │
│   three-dimensional object for display in a user interface │
└────────────────────────────────────────────────────────────┘
                            │
                            ▼
┌────────────────────────────────────────────────────────────┐
│                          1204                              │
│   Receive a selection input selecting the first            │
│   three-dimensional object                                 │
└────────────────────────────────────────────────────────────┘
                            │
                            ▼
┌────────────────────────────────────────────────────────────┐
│                          1206                              │
│   Output an alignment guide for display in relation to a   │
│   first three-dimensional object in a user interface       │
└────────────────────────────────────────────────────────────┘
                            │
                            ▼
┌────────────────────────────────────────────────────────────┐
│                          1208                              │
│   Receive an input generated with respect to the           │
│   alignment guide as involving selection and movement of   │
│   a respective portion of the first three-dimensional      │
│   object                                                   │
└────────────────────────────────────────────────────────────┘
                            │
                            ▼
┌────────────────────────────────────────────────────────────┐
│                          1210                              │
│   Detect the input causes the respective portion of the    │
│   first three-dimensional object to be disposed within a   │
│   threshold distance of a portion of a second three-       │
│   dimensional object                                       │
└────────────────────────────────────────────────────────────┘
                            │
                            ▼
┌────────────────────────────────────────────────────────────┐
│                          1212                              │
│   Reorient, responsive to the detecting, the first three-  │
│   dimensional object in the user interface in three-       │
│   dimensional space such that the respective portion of    │
│   the first three-dimensional object appears disposed on   │
│   the portion of the second three-dimensional object       │
└────────────────────────────────────────────────────────────┘
                            │
                            ▼
┌────────────────────────────────────────────────────────────┐
│                          1214                              │
│   Output, responsive to the reorienting, an option guide   │
│   indicating one or more directions of movement supported  │
│   by the three dimensional object in relation to the       │
│   portion of the second three-dimensional object           │
└────────────────────────────────────────────────────────────┘
```

1600 ——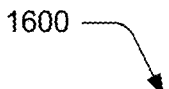

1602
Receive a first user input via a user interface, the first user input specifying a first visual characteristic to be used as a highlight in illuminating a three-dimensional environment 1604
Receive a second user input via the user interface, the second input specifying a second visual characteristic to be used as a midtone in illuminating the three-dimensional environment 1606
Receive a third user input via the user interface, the third user input specifying a second visual characteristic to be used as a shadow in illuminating the three-dimensional environment 1608
Control rendering of the three-dimensional environment 1610
Identify a first portion of the three-dimensional environment that is to be a subject of the highlight, a second portion of the three-dimensional environment that is to be a subject of the midtone, and a third portion of the three-dimensional environment that is to be a subject of the shadow 1612
illuminate the three-dimensional environment by applying the first visual characteristic to the first portion of the three-dimensional environment, the second visual characteristic to the second portion of the three-dimensional environment, and the third visual characteristic to the third portion of the three-dimensional environment

Fig. 16

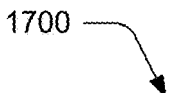

1700

---

1702
Receiving user inputs via a user interface specifying at least two colors

---

1704
Illuminate a three-dimensional object in a three-dimensional environment displayable in a user interface through execution of a rendering engine using the at least two colors, respectively, as a highlight, a midtone, or a shadow

---

1706
Output the three-dimensional object rendered through execution of a rendering engine > 1708
> A first color is user specified for a highlight associated with a first surface of the three-dimensional object based on a position of a light source defined in relation to the three-dimensional environment > 1710
> A second color is user specified for a midtone associated with a second surface of the three-dimensional object based on the position of the light source defined in relation to the three-dimensional environment > 1712
> A third color is user specified for a show cast by the three-dimensional object based on the position of the light source defined in relation to the three-dimensional environment

THREE-DIMENSIONAL OBJECT MANIPULATION CONTROL

RELATED APPLICATIONS

This application claim priority under 35 U.S.C. § 119(e) to U.S. Provisional Patent Application No. 63/588,822, filed Oct. 9, 2023, and titled "Three-Dimensional Object Editing and Visualization," the entire disclosure of which is hereby incorporated by reference.

BACKGROUND

Three-dimensional environments have been developed to expand a visual richness into what can be perceived within the environment as well as a richness in user interaction within the environment. Creation of digital content that supports a three-dimensional environment, however, is confronted with numerous technical challenges. These technical challenges are typically introduced by complexity by a nature of the three-dimensional environment as well as operations used to edit the three-dimensional environment.

Content creators familiar with operations used by conventional content editing systems used to create two-dimensional content, for instance, are generally unfamiliar with changes to operations introduced by these technical challenges. As a result, content creators when confronted with conventional content creation systems often forgo use of this functionality or engage in prolonged and inefficient manual interaction with the content creation systems. These complications in real world scenarios result in a corresponding decrease in operation and computational functionality of computing devices that implement these techniques, cause user frustration, and so forth.

SUMMARY

Three-dimensional object edit and visualization techniques and systems are described. In a first example, a content navigation control is implemented by a content editing system to aid navigation through a history of how a three-dimensional (3D) environment and a three-dimensional object included in the environment is created. In a second example, the content editing system is configured to streamline placement of a three-dimensional object within a three-dimensional environment. The content editing system, for instance, generates a manipulation visualization in support of corresponding editing operations to act as a guide, e.g., as an alignment guide or an option guide. In a third example, the content editing system implements a shadow control that is usable as part of an editing and as a visualization to control rendering of illumination within a three-dimensional environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 3 is a flow diagram depicting an algorithm as a step-by-step procedure in an example implementation of operations performable for accomplishing a result of generation of an operation stack as having operation representations of operations used to generate an item of digital content.

FIG. 4 depicts a system in an example implementation showing operation of a digital search service of the digital services of FIG. 1 in greater detail as locating an item of digital content having an operation stack.

FIG. 5 is a flow diagram depicting an algorithm as a step-by-step procedure in an example implementation of operations performable for accomplishing a result of a digital content search to locate an item of digital content having an operation stack.

FIG. 6 depicts a system in an example implementation showing operation of a content navigation module of FIG. 1 in greater detail as implementing a content navigation control to navigate through an operation stack of a located item of digital content.

FIG. 8 is a flow diagram depicting an algorithm as a step-by-step procedure in an example implementation of operations performable for accomplishing a result of navigation through operation representations to control output of corresponding versions of digital content using a content navigation control.

FIG. 12 is a flow diagram depicting an algorithm as a step-by-step procedure in an example implementation of operations performable for accomplishing a result of guiding movement of three-dimensional objects in relation to each other in a three-dimensional environment.

FIG. 16 is a flow diagram depicting an algorithm as a step-by-step procedure in an example implementation of operations performable for accomplishing a result of controlling rendering of illumination in a three-dimensional environment using manually specified visual characteristics.

FIG. 17 is a flow diagram depicting an algorithm as a step-by-step procedure in an example implementation of operations performable for accomplishing a result of controlling rendering of illumination in a three-dimensional environment using manual inputs specifying at least two colors.

DETAILED DESCRIPTION

Overview

Figure 1:
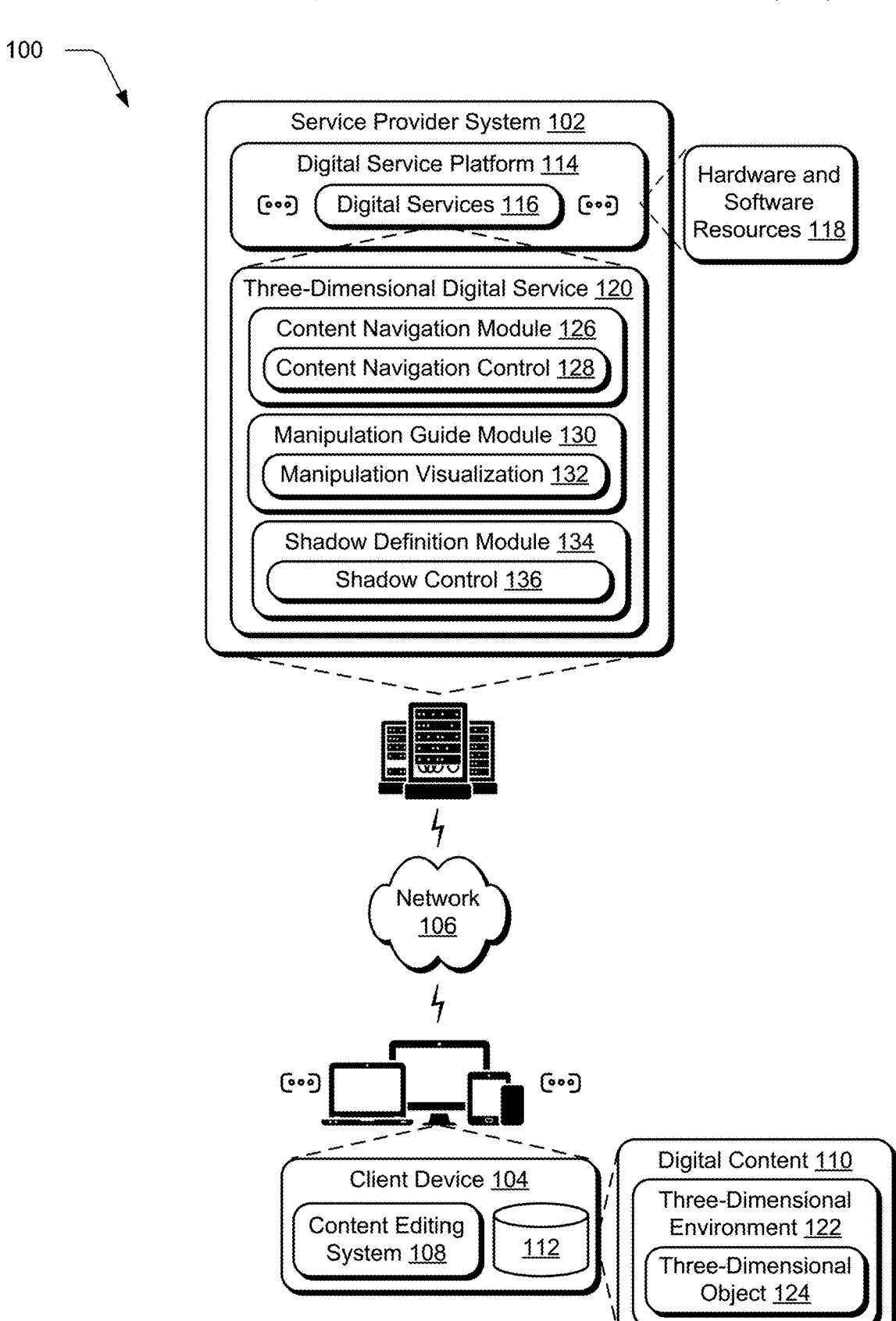
FIG. 1 is an illustration of a digital medium environment in an example implementation that is operable to employ three-dimensional object editing and visualization techniques described herein.

Three-dimensional environments have been developed to expand on functionality available by digital content over functionality that is available via a two-dimensional environment. A three-dimensional environment, for instance, is configurable to define three-dimensional objects within the environment to support changes in a viewpoint in relation to the three-dimensional environment, positions of a light source within the three-dimensional environment, and so on.

However, technical challenges and user inefficiencies are introduced by conventional content editing systems when attempting to create and edit digital content that supports a three-dimensional environment, e.g., a three-dimensional object such as an isometric shape. Examples of these challenges include challenges in understanding operations that are targeted for use in a three-dimensional environment, how to define a relationship of different three-dimensional objects with each other within the environment, limitations in how illumination is defined within a three-dimensional environment in conventional systems using a "black box" technique that provides limited insight and control, and so forth.

Accordingly, three-dimensional object edit and visualization techniques and systems are described that address these technical challenges to improve user efficiency in interaction with a user interface that supports three-dimensional environment edits, manipulation, and illumination. As a result, these techniques and systems improve operation of computing devices that implement the techniques, increase user interaction efficiency with corresponding user interfaces, and aid user understanding in addressing the technical challenges involved in three-dimensional object editing.

In a first example, a content navigation control is implemented by a content editing system to aid navigation through a history of how a three-dimensional (3D) environment and a three-dimensional object included in the environment is created. The content editing system, for instance, is configured to support operations to edit (e.g., create) digital content having a three-dimensional (3D) object. During editing of the digital content, inputs are received by the content editing system to execute corresponding operations as part of creating the three-dimensional object.

Operation representations are generated by the content editing system by monitoring receipt of the inputs. For example, an operation representation references a respective executed operation, i.e., the operation is referenced by the operation representation. The content editing system, in one or more examples, generates an operation stack having operation representations in an ordered sequence following an order, in which, as the inputs are received. The operation sequence therefore defines a creative process used to generate an item of digital content having a three-dimensional environment, e.g., includes a three-dimensional object. The operation sequence is storable as part of the digital content (e.g., as metadata associated with the digital content), as a separate file, and so forth.

The operation sequence then supports an ability to view how the digital content is created. A collection of representations of digital content, for instance, may be included for display in a user interface, e.g., accessible via a social network digital service, a stock digital service, and so on. The representations are selectable to display the digital content along with a corresponding content navigation control.

The content navigation control supports navigation through the operation stack to respective operation representations and corresponding operations used to generate the digital content. A version of the digital content displayed in the user interface, therefore, is editable and as such provides increased functionality over conventional teaching techniques that rely on a video to records digital content creation but does not support user interaction.

In an implementation, the operation sequence also includes operation representations of operations that are "backed out" (i.e., deleted, removed, "undone", and so forth) and thus are not used to generate a final version of the digital content. In other words, generation of the final version is performed independent of these operations. In this way, user interaction is supported with increased insight into viewing potential mistakes that are made and how those mistakes are subsequently rectified in generating the digital content, which is not possible in conventional techniques.

The operation stack also supports definition of a starting point to generate a "new" item of digital content. A creative professional, for instance, may view an item of digital content of interest at a digital service that provides stock digital content but desire to make changes to the item of digital content. Access to the item of digital content may therefore be purchased by a creative professional, e.g., through the stock digital service as a one-time fee or subscription. The creative professional then interacts with the content navigation control to navigate to a point of interest and provide subsequent inputs to create the new item of digital content using that point of interest as a starting point. The operation stack may also be updated to reflect these changes, e.g., by including operation representations of subsequent operations. In this way, user interaction and computational efficiency is increased, e.g., for a creative professional to create a multitude of related digital content. Further discussion of these and other content navigation control examples are described in relation to FIGS. 2-8.

In a second example, a content editing system is configured to streamline placement of a three-dimensional object within a three-dimensional environment. The content editing system, for instance, generates a manipulation visualization in support of corresponding editing operations to act as a guide. The manipulation visualization is usable as a guide for placement of a three-dimensional object within the three-dimensional environment as well as placement of the three-dimensional object with respect to other three-dimensional objects.

The manipulation visualization is configurable in a variety of ways. In a first instance, the manipulation visualization is configurable as an alignment guide to indicate orientation of a three-dimensional object in three dimensions. The alignment guide is also configurable to include indications of selectable portions (e.g., surfaces, edges, etc.) of the three-dimensional object. The portions, once selected, are usable to control a "snapping" behavior in which the selection portion is reoriented in the user interface to a corresponding portion of another three-dimensional object when within a threshold distance of each other. The reorienting, in one or more examples, causes reorientation of a corresponding three-dimensional object in three axes, e.g., X, Y, and Z axes.

Once reoriented, the manipulation visualization is also configurable as an option guide indicating one or more directions of movement that are supported by the content editing system in movement of the three-dimensional object in relation to the other three-dimensional object, e.g., to "slide" along a respective surface. In this way, the manipulation guide module supports improved and intuitive user interaction within the three-dimensional environment, further discussion of which is described in relation to FIGS. 9-12.

In a third example, the content editing system implements a shadow control that is usable as part of an editing and as a visualization to control rendering of illumination within a three-dimensional environment. In conventional techniques, a base color of an object is modified within the three-dimensional environment to define illumination by changing tones of the base color to form a highlight, midtone, and shadow. However, in some instances these changes depart from expectations and desires of a creative professional, such as to maintain a particular color tone for use as part of a logo that when changed no longer follows a desired branding.

Accordingly, the content editing system supports user inputs to define visual characteristics to be used when rendering the three-dimensional environment. The user inputs, for instance, are received individually to define respective colors to be used for the highlight, midtones, and/or shadow within the three-dimensional environment, e.g., for a particular three-dimensional object. Other visual characteristics are also definable, e.g., using patterns and gradients. A three-dimension object, therefore, once illuminated as part of rendering in a three-dimensional environment is constrained to use of the defined colors. The color for the highlight, for instance, is used for a surface of the three-dimensional object closest to a light source, a color for a midtone for a surface of the three-dimensional object that is partially shadowed (i.e., not in direct view of the light source), and a color for the shadow cast by the three-dimensional object within the three-dimensional environment.

Subsequent edits may then be made to the three-dimensional environment (e.g., to reposition a light source), which continue use of the specified visual characteristics. In this way, direct control is supported in how illumination is implemented as part of rendering the three-dimensional environment, which is not possible in conventional techniques and further discussion of which is described in relation to FIGS. 13-17.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Three-Dimensional Object Editing Environment

FIG. 1 is an illustration of a digital medium environment 100 in an example implementation that is operable to employ three-dimensional object editing and visualization techniques described herein. The illustrated environment 100 includes a service provider system 102 and a client device 104 that are communicatively coupled, one to another, via a network 106. Computing devices that implement the service provider system 102 and the client device 104 are configurable in a variety of ways.

A computing device, for instance, is configurable as a desktop computer, a laptop computer, a mobile device (e.g., assuming a handheld configuration such as a tablet or mobile phone as illustrated), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in some examples, a computing device is also representative of a plurality of different devices, such as multiple servers utilized by a business to perform operations "over the cloud" as described in FIG. 18.

The client device 104 is illustrated as including a content editing system 108. The content editing system 108 is implemented at least partially in hardware of the client device 104 to process and transform digital content 110, which is illustrated as maintained in a storage device 112 of the client device 104. Such processing includes creation of the digital content 110, modification of the digital content 110, and rendering of the digital content 110 in a user interface for output, e.g., by a display device.

The service provider system 102 is illustrated in this example as implementing a digital service platform 114 to provide digital services 116 through execution of hardware and software resources 118. The digital services 116 are representative of functionality made available by the service provider system 102 via the network 106 to the client device 104. In a first instance, the digital services 116 include a social network service that is executable to share communications, posts, digital content, and so forth. In a second instance, the one or more digital service 116 include a stock digital service that is configured to provide access to digital content (e.g., for a fee) that is located using a digital search service.

In the illustrated instance, the digital services 116 include a three-dimensional digital service 120. The three-dimensional digital service 120 is configured to operate in this example in conjunction with the content editing system 108 to support functionality to edit (e.g., create) a three-dimensional environment 122 and a three-dimensional object 124 disposed within the three-dimensional environment 122. Although illustrated as implemented at the service provider system 102 as one of the digital services 116, this functionality may also be implemented locally at the client device 104, e.g., solely by the content editing system 108.

The three-dimensional digital service 120 supports a variety of functionality that is configured to support and implement editing of the three-dimensional environment 122 and the three-dimensional object 124. Examples of which to do so are represented as a content navigation module 126 configured to implement a content navigation control 128, a manipulation guide module 130 configured to implement a manipulation visualization 132, and a shadow definition module 134 configured to implement a shadow control 136.

The content navigation module 126 is configured to generate an operation stack that identifies operations used to generate the digital content 110. The content navigation control 128 is then utilized to navigate through the operation stack and view corresponding versions of the three-dimensional environment 122 and three-dimensional object 124. These versions are also usable to support further editing, and thus increase efficiency in creation of additional digital content, such as to generate differences in the three-dimensional environment 122 and the three-dimensional object 124, further discussion of which may be found in relation to FIGS. 3-8 in a corresponding section.

The manipulation guide module 130 is configured to streamline placement of the three-dimensional object 124 within the three-dimensional environment 122. To do so, the manipulation guide module 130 employs a manipulation visualization 132 and corresponding operations as an aide to guiding placement of the three-dimensional object 124 within the three-dimensional environment 122 as well as placement of the three-dimensional object 124 with respect to other three-dimensional objects. The manipulation visualization 132, for instance, is configurable as an alignment guide to indicate orientation of a three-dimensional object 124 in three dimensions of the three-dimensional environment 122. The alignment guide is also configurable to include indications of selectable portions (e.g., surfaces, edges, etc.) of the three-dimensional object 124 to be used as a basis to align the three-dimensional object 124 with another three-dimensional object.

Once selected, for example, the portions are usable to control a "snapping" behavior in which a selected portion of the three-dimensional object is reoriented in the user interface to a corresponding portion of another three-dimensional object when within a threshold distance of each other. Once reoriented, the manipulation visualization 132 is also configurable as an option guide indicating one or more directions of movement that are supported by the content editing system 108 in movement of the three-dimensional object with respect to the other three-dimensional object, e.g., to "slide" along a respective surface. In this way, the manipulation guide module 130 supports improved and intuitive user interaction within the three-dimensional environment 122 which is not possible in conventional techniques, further discussion of which is described in relation to FIGS. 9-12 in a corresponding section.

In a third example, the shadow definition module 134 implements a shadow control 136 that is usable as part of an editing and visualization to control rendering of illumination within a three-dimensional environment 122. In conventional techniques, a base color is used as a basis to define illumination within the there-dimensional environment. Tones of the base color are then changed automatically and without intervention or user control to form a highlight, midtone, and shadow. However, these changes depart in some scenarios from a desire of a creative professional, such as to maintain a particular color for use as part of a logo.

Accordingly, the shadow definition module 134 supports user inputs to define visual characteristics for use when rendering the three-dimensional environment 122. The user inputs, for instance, are received individually to define respective colors to be used for the highlight, midtones, and/or shadow within the three-dimensional environment 122, e.g., for a particular three-dimensional object 124. Other visual characteristics are also definable, e.g., using patterns and gradients.

Subsequent edits may then be made to the three-dimensional environment 122. Use of the specified visual characteristics continues during subsequent rendering of the three-dimensional environment 122, e.g., to define illumination within the environment. In this way, direct control is supported in how illumination is rendered within the three-dimensional environment 122, which is not possible in conventional techniques and further discussion of which is described below in relation to FIGS. 13-17 in a corresponding section.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Content Navigation Control and Operation Stack

The following discussion describes content navigation control and operation techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Figure 2:
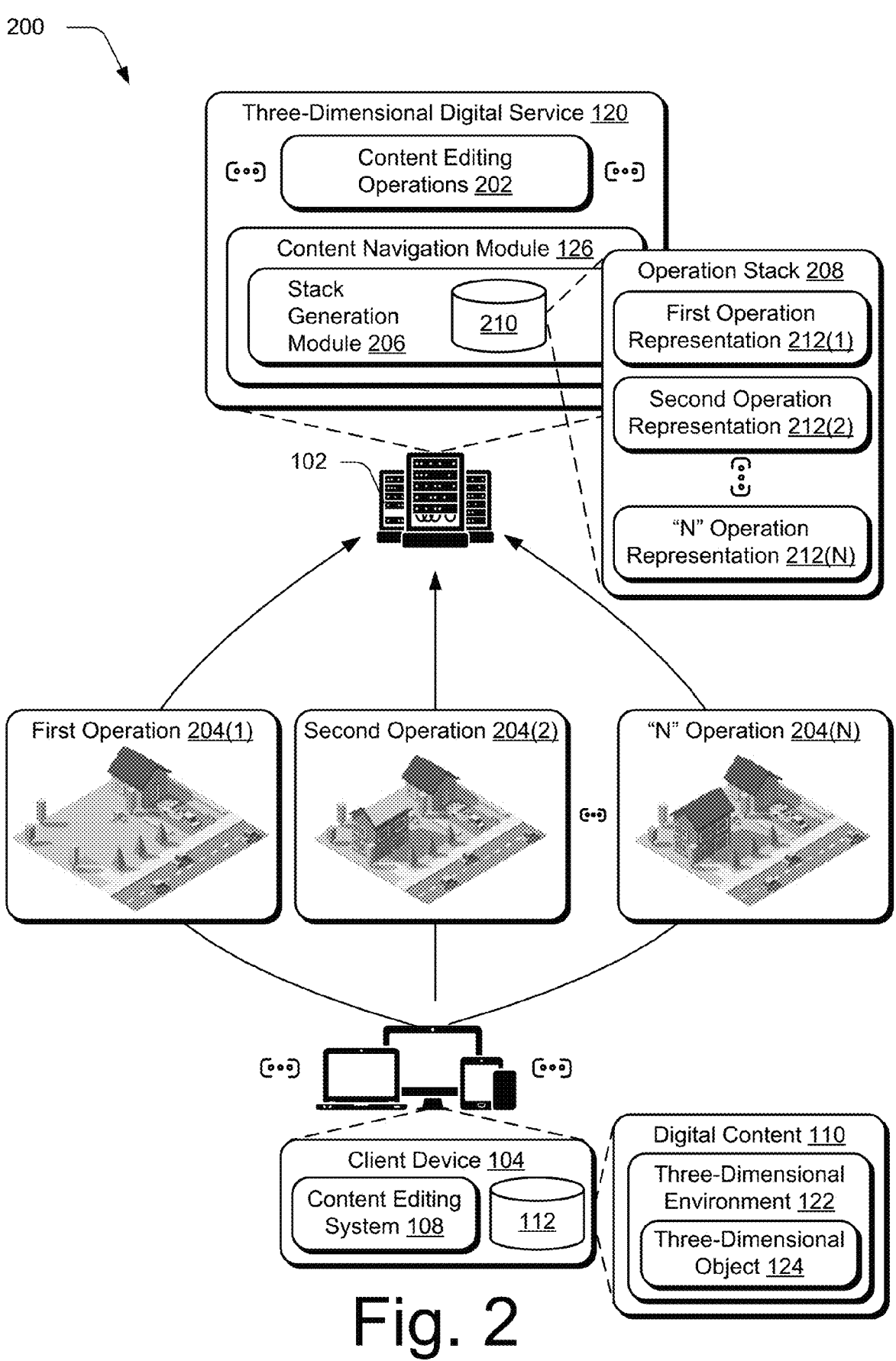
FIG. 2 depicts a system in an example implementation showing operation of a content navigation module of FIG. 1 in greater detail as generating an operation stack of operation representations based on monitored operations used to generate a three-dimensional environment.

FIG. 2 depicts a system 200 in an example implementation showing operation of the content navigation module 126 of FIG. 1 in greater detail as generating an operation stack of operation representations based on monitored operations used to generate a three-dimensional environment 122. FIG. 3 is a flow diagram depicting an algorithm as a step-by-step procedure 300 in an example implementation of operations performable for accomplishing a result of operation stack generation having operation representations of operations used to generate an item of digital content. The following discussion of the system 200 of FIG. 2 is made in parallel with the procedure 300 of FIG. 3.

The three-dimensional digital service 120 in the illustrated scenario supports a plurality of content editing operations 202 that are executable to edit (e.g., create) the three-dimensional environment 122 (e.g., the three-dimensional object 124) as part of the digital content 110. The plurality of content editing operations 202, for instance, are configurable to form the three-dimensional object 124 as isometric shapes, define the three-dimensional object using signed distance functions (SDFs), define a location of a light source within the three-dimensional environment 122, position the three-dimensional object 124 within the three-dimensional environment 122 (e.g., in relation to another three-dimensional object), and so on.

The content editing system 108, for instance, is configured to communicate with the three-dimensional digital service 120 via the network as specify a first operation 204(1) input, second operation 204(2) input, . . . , through an "N" operation 204(N) input. In this illustrated example, the inputs specifying the plurality of content editing operations 202 are used to generate the three-dimensional object 124 as a house within the three-dimensional environment 122 of a neighborhood yard.

The content navigation module 126, therefore, receives the plurality of inputs as specifying the operations used to generate the three-dimensional object 124 (block 302). A stack generation module 206 is then utilized by the content navigation module 126 to generate an operation stack 208 by monitoring the received plurality of inputs, which is stored in a storage device 210.

The operation stack 208 includes a plurality of operation representations in an ordered sequence (block 304), e.g., based on a sequence in which the inputs are received from the client device 104. The operation stack 208, for instance, is configurable as a tech stack (e.g., in accordance with Elixir) having operation representations. The operation representations are included in the operation stack 208 as an ordered sequence that corresponds to a sequence, at which, the inputs are received, e.g., as a first operation representation 212(1), second operation representation 212(2), . . . , through "N" operation representations 212(N). The operation representations, in one or more implementations, are executable as instructions to cause corresponding content editing operations 202 to be performed to generate a corresponding version of the digital content 110, e.g., using corresponding collections of the operations.

In an implementation, the operation stack 208 includes operation representations for each of the operations received as inputs by the stack generation module 206, even in instances in which the operations did not contribute to a final version of the digital content 110, e.g., were "backed out." A creative, for instance, interacts with the content editing system 108 to specify an input, a result of which is no longer desired and therefore is modified, made subject to an "undo" operation, and so forth. Thus, in this implementation the operation stack 208 is "complete" in that each operation received as an input is included in the operation stack 208 as part of editing the three-dimensional environment 122.

As a result, the operation stack 208 provides a source of information regarding creation of the three-dimensional environment 122 and three-dimensional object 124, e.g., for an entirety of how the digital content 110 is created in practice in the above implementation. Other implementations are also contemplated in which the operation stack 208 includes operation representations, solely or partially, of operations that contributed towards generation of the digital content 110. The three-dimensional object 124 and a content navigation control are then output for display in a user interface (block 306) to support navigation through the operation stack 208 as further described in the following discussion.

FIG. 4 depicts a system 400 in an example implementation showing operation of a digital search service of the digital services 116 of FIG. 1 in greater detail as locating an item of digital content having an operation stack. FIG. 5 is a flow diagram depicting an algorithm as a step-by-step procedure 500 in an example implementation of operations performable for accomplishing a result of a digital content search to locate an item of digital content. The following discussion of the system 400 of FIG. 4 is made in parallel with the procedure 500 of FIG. 5.

The digital services 116 in this example include a digital search service 402 that is configured to search a storage device 404 to locate digital content 110 from a plurality of digital content. The digital search service 402, for instance, is configurable as part of stock content service, a social media service, and so on. For example, the digital search service 402 receives a search query 406 via a user interface 408 as text specifying "3D Homes in a Neighborhood" and generates a search result 410. Other examples are also contemplated, such as an image search in which a digital image acts as the search query 406.

The search result 410 is then output by the digital search service 402 for display in the user interface 408, e.g., at the client device 104. The search result 410 includes a plurality of representations 412, 414, 416, 418, 420, 422 corresponding, respectively, to digital content having a three-dimensional object (block 502). The plurality of representations 412-422 in the illustrated example are configured as thumbnails including depictions of respective three-dimensional environments.

An input 424 is then received as selecting a representation 412 from the plurality of representations 412-422 (block 504), e.g., via a cursor control device, gesture, spoken utterance, or other input received via the user interface 408 at the client device 104 and communicated to the service provider system 102. Digital content 110 corresponding to the selected representation is obtained that includes the operation stack 208 having a plurality of operation representations in an ordered sequence used to generate a respective digital object (block 506). Navigation is then controlled through a plurality of versions of the respective three-dimensional object 124 corresponding to respective locations within the ordered sequence of the operation stack 208 using a content navigation control 128 (block 508), further discussion of which is included in the following example.

Figure 6:
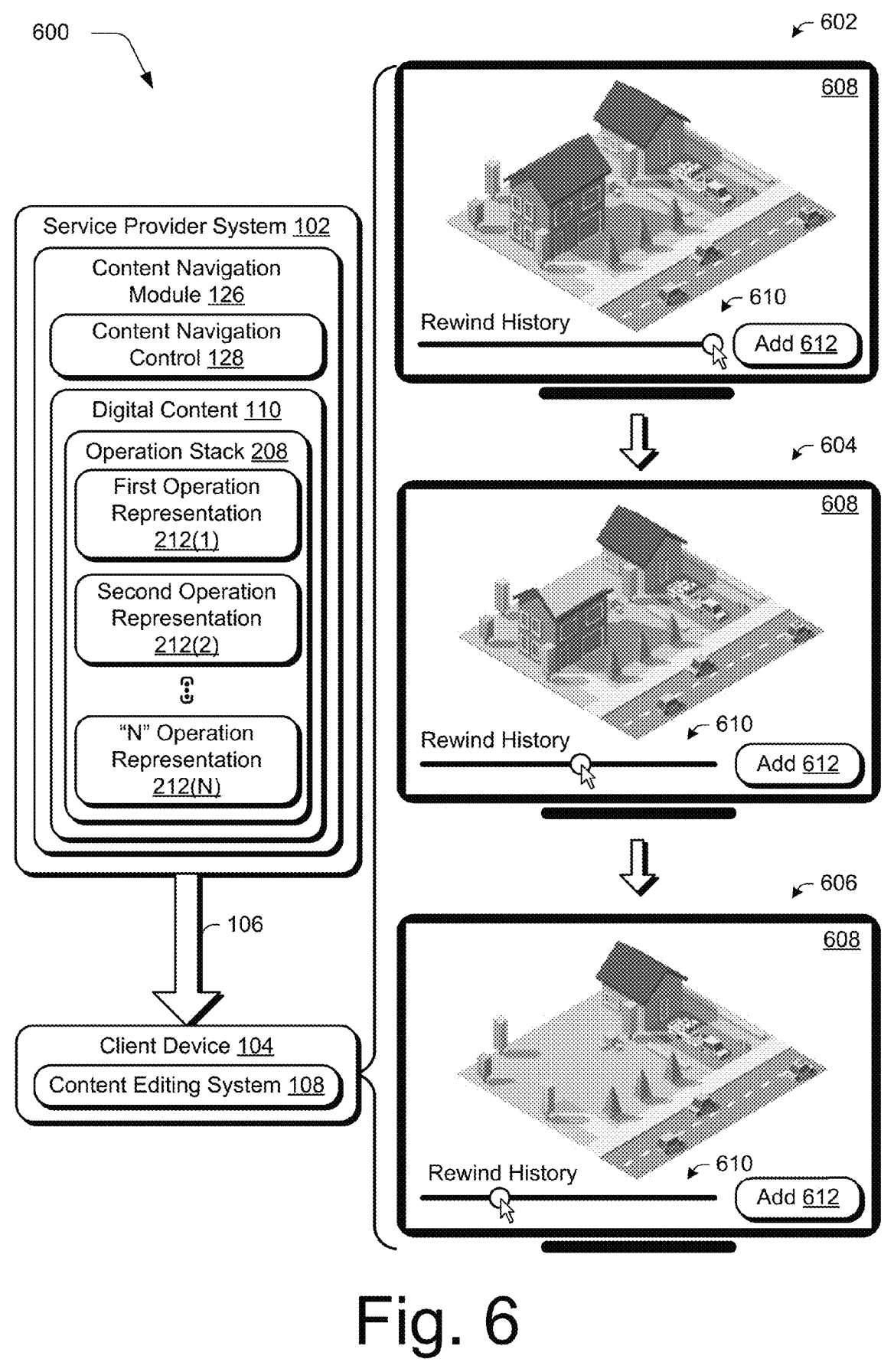
Figure 7:
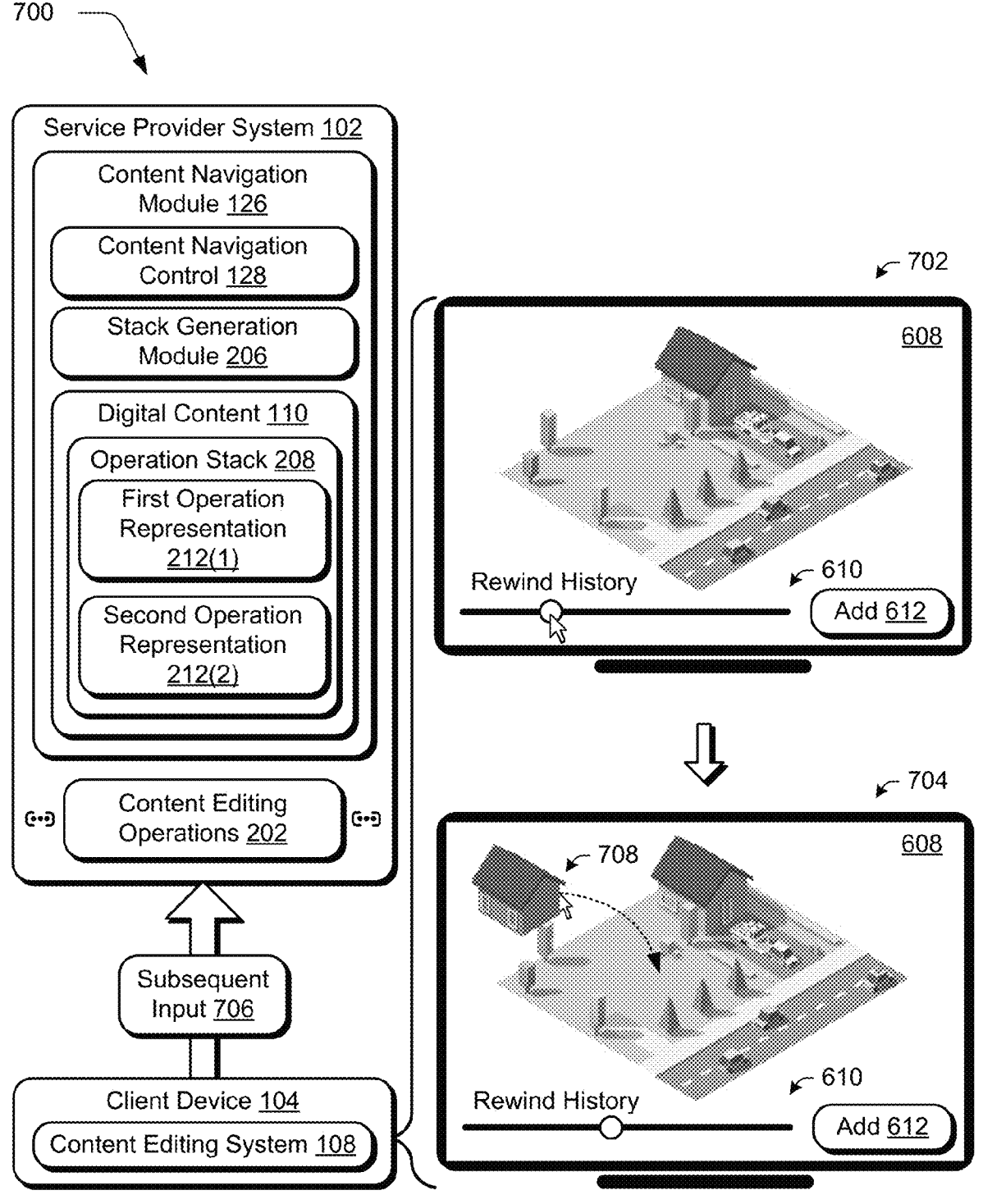
FIG. 7 depicts a system in an example implementation showing interaction with a content navigation control to navigate through an operation stack to initiate creation of a new item of digital content.

FIG. 6 depicts a system 600 in an example implementation showing operation of a content navigation module of FIG. 1 in greater detail as implementing a content navigation control to navigate through an operation stack of an item of digital content. FIG. 7 depicts a system 700 in an example implementation showing interaction with a content navigation control to navigate through an operation stack to initiate creation of a new item of digital content. FIG. 8 is a flow diagram depicting an algorithm as a step-by-step procedure 800 in an example implementation of operations performable for accomplishing a result of navigation through operation representations to control output of corresponding versions of digital content using a content navigation control. The following discussion of the systems 600 and 700 of FIGS. 6 and 7 is made in parallel with the procedure 800 of FIG. 8.

In the illustration of FIG. 6, the content navigation module 126 and content navigation control 128 are executed at the service provider system 102 to navigate through the operation representations of the operation stack 208. A result of which is rendered and communicated via the network 106 for output at a display device of the client device 104. Other examples are also contemplated in which the digital content 110 having the operation stack 208 is communicated over the network 106 to the client device 104, is generated locally at the client device 104, and so on. This illustration is depicted using a first stage 602, a second stage 604, and a third stage 606 that show a user interface 608 displayed on a display device of the client device 104.

Regardless of how implemented, a user input is received. The user input is generated via user interaction with the content navigation control 128. The content navigation control 128 is configured to navigate through an ordered sequence of operations used to generate the three-dimensional object (block 802). In the illustrated example, the content navigation module 126 is depicted as a slider 610, although other examples are also contemplated such as a dial or other representation usable to indicate respective locations in an ordered sequence, as input as a numerical value, and so on. As shown at the first stage 602, for instance, a user input is received as selecting the slider 610 using a cursor control device and is navigated backward through a "rewind history" of generation of the digital content 110 as shown at the second stage 604. An option 612 is also included in the user interface to "add" the three-dimensional object 124 and/or three-dimensional environment 122 to another item of digital content.

A determination is then made as to a location with respect to the ordered sequence based on the user input (block 804), e.g., by the content navigation module 126 of the service provider system 102 and/or the client device 104. The content navigation module 126, for instance, determines which operation representation in the operation stack 208 corresponds to the user input based on a relative location of the input with respect to a length of the ordered sequence as represented by the content navigation control 128. In response, the content navigation module 126 generates a version of the three-dimensional object using one or more operations from the ordered sequence of operations that correspond to the location (block 806). The version of the three-dimensional object 124 is then output for display in the user interface (block 808) as shown in the user interface 608 at the second stage 604.

This process may continue as shown at the third stage 606 in support of real time output such that as inputs are received specifying different locations with respect to the content navigation control 128, corresponding versions of the digital content 110 are rendered for display in the user interface 608. At the first stage 602, for instance, a user input is received to navigate backwards through the operation stack 208. In response, a roof of a house is removed as depicted at the second stage 604, with an entirety of the house removed at the third stage 602. In this way, navigation is supported through the operation representations to gain insight into how corresponding versions of the three-dimensional object 124 and consequently the three-dimensional environment 122 are created. Additional features are also contemplated, includes examples of which include depictions of execution of the plurality of content editing operations 202 in a user interface. The user interface 608, in another example, is configurable to depict, non-modally, the operation representations from the operation stack 208 corresponding to a current version of the digital content 110 as rendered in the user interface 608, e.g., which operation representation are applied and which are not.

Navigation is supported both forward and backward through the operation stack 208 using the content navigation control 128. Further, as previously described the content navigation control 128 supports output of "real editable" versions of the digital content 110 and consequently supports subsequent user edits that may serve as a starting point to form "new" versions of the digital content 110 and thus increase user efficiency.

The example system 700 of FIG. 7, for instance, is also depicted using a first stage 702 and a second stage 704. Continuing the previous example, user interaction with the user interface 608 specifies a location within the operation stack 208, which in this example has a three-dimensional object of a house removed from the digital content 110 as shown in FIG. 6.

A creative in this example then desires to replace the removed house with a different house 708 as shown at the second stage 704. To do so, a subsequent input 706 is generated by the content editing system 108 and is received by the service provider system 102. The operation input 706 specifies a respective content editing operation 202 (i.e., subsequent operation) that is usable to edit the version of the three-dimensional object (block 810) as depicted in the user interface 608, e.g., to add the different house 708. Accordingly, an edited three-dimensional object is generated (block 812) for inclusion in the three-dimensional environment 122 (block 812).

The ordered sequence of operations is also updated by the stack generation module 206 to include the respective operation (block 814). In an implementation, for instance, the version of the digital content at the first stage 702 is generated using one or more operations that correspond to the location specified by the content navigation control 128, e.g., that correspond to the first operation representation 212(1) and the second operation representation 212(2). The stack generation module 206 is then utilized to configure the ordered sequence of the operation stack 208 to include a subsequent operation representation of the subsequent operation, e.g., used to add the other house. In this way, the stack generation module 206 is configured to respond dynamically and in real time to changes made to the digital content 110.

Operation representations that do not correspond to that location are discarded in one example, e.g., such that the updated ordered sequence does not include an operation representation of those operations occurring after the location in the ordered sequence used as the starting point in the above example. Other examples are also contemplated in which each of the operation representations are maintained, e.g., as branches within the ordered sequence of the operation stack 208. In this way, the content navigation module 126 and content navigation control 128 support increased insight into creation of three-dimensional environment 122 and three-dimensional object 124 in digital content 110 of interest, which is not possible in conventional techniques.

Example Manipulation Visualization and Editing

Figure 9:
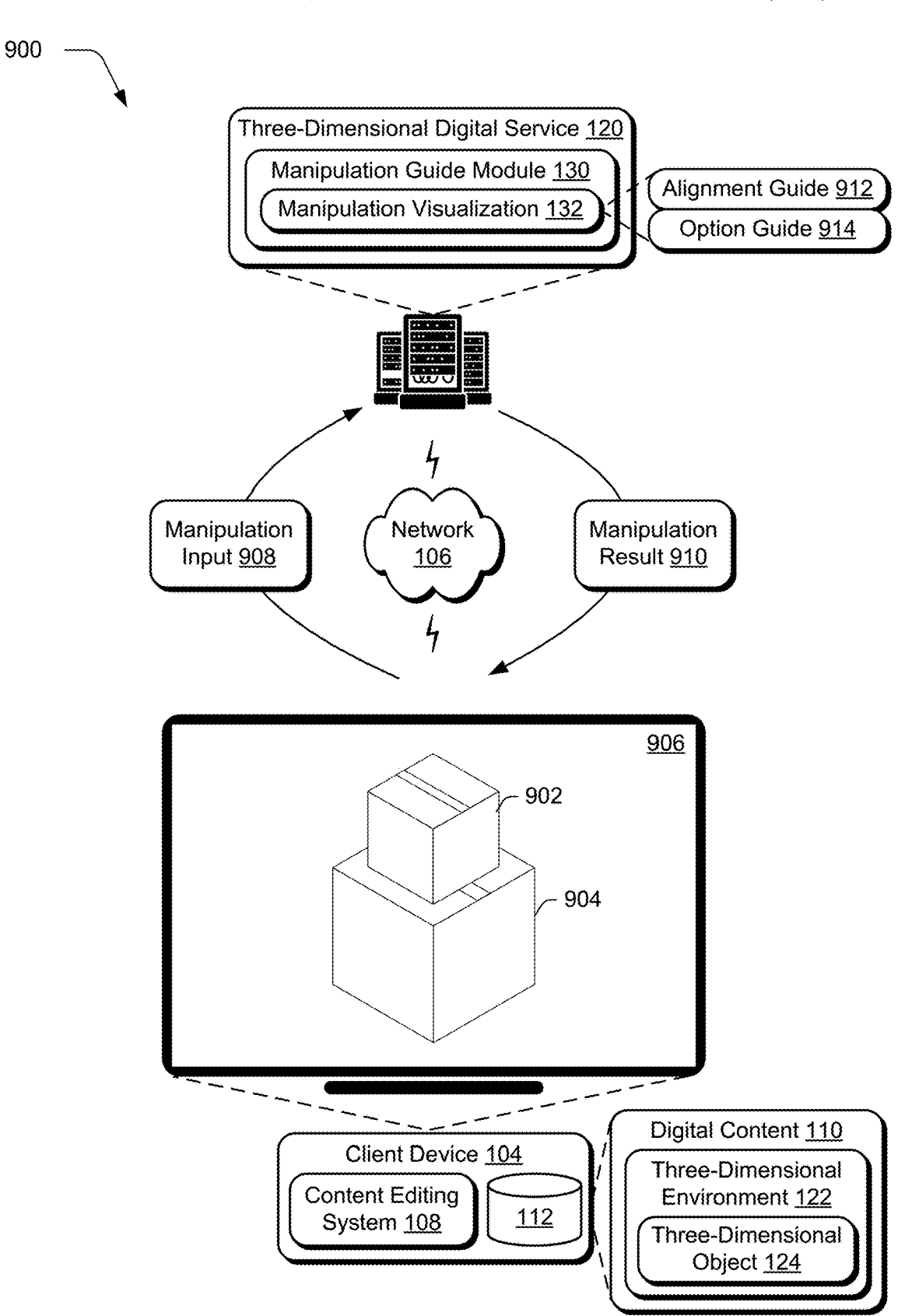
FIG. 9 depicts a system in an example implementation showing operation of a manipulation guide module and manipulation guide of FIG. 1 in greater detail.
Figure 10:
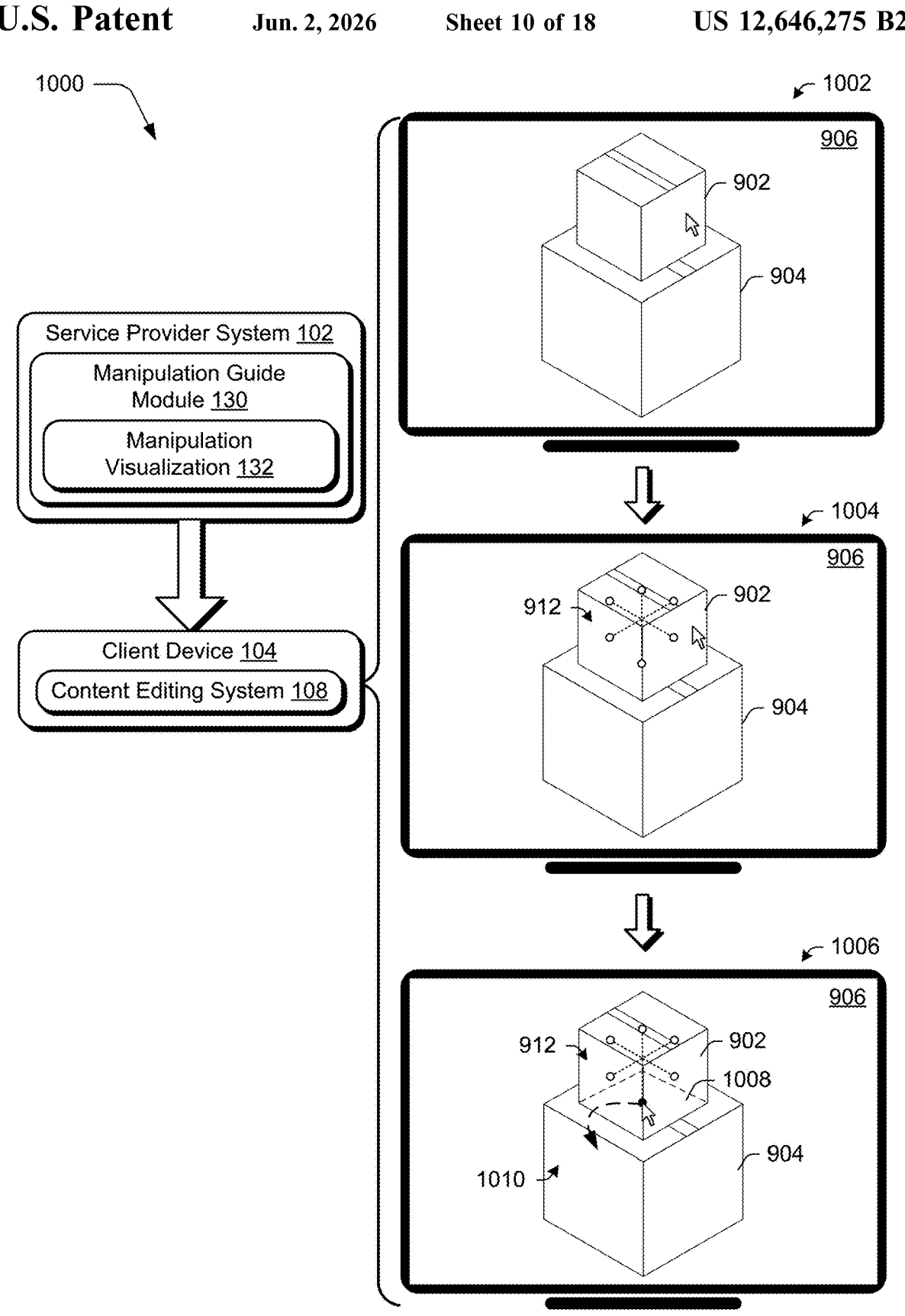
FIG. 10 depicts a system in an example implementation showing operation of a manipulation guide as implemented as an alignment guide to guide reorientation and alignment of three-dimensional objects in relation to each other.
Figure 11:
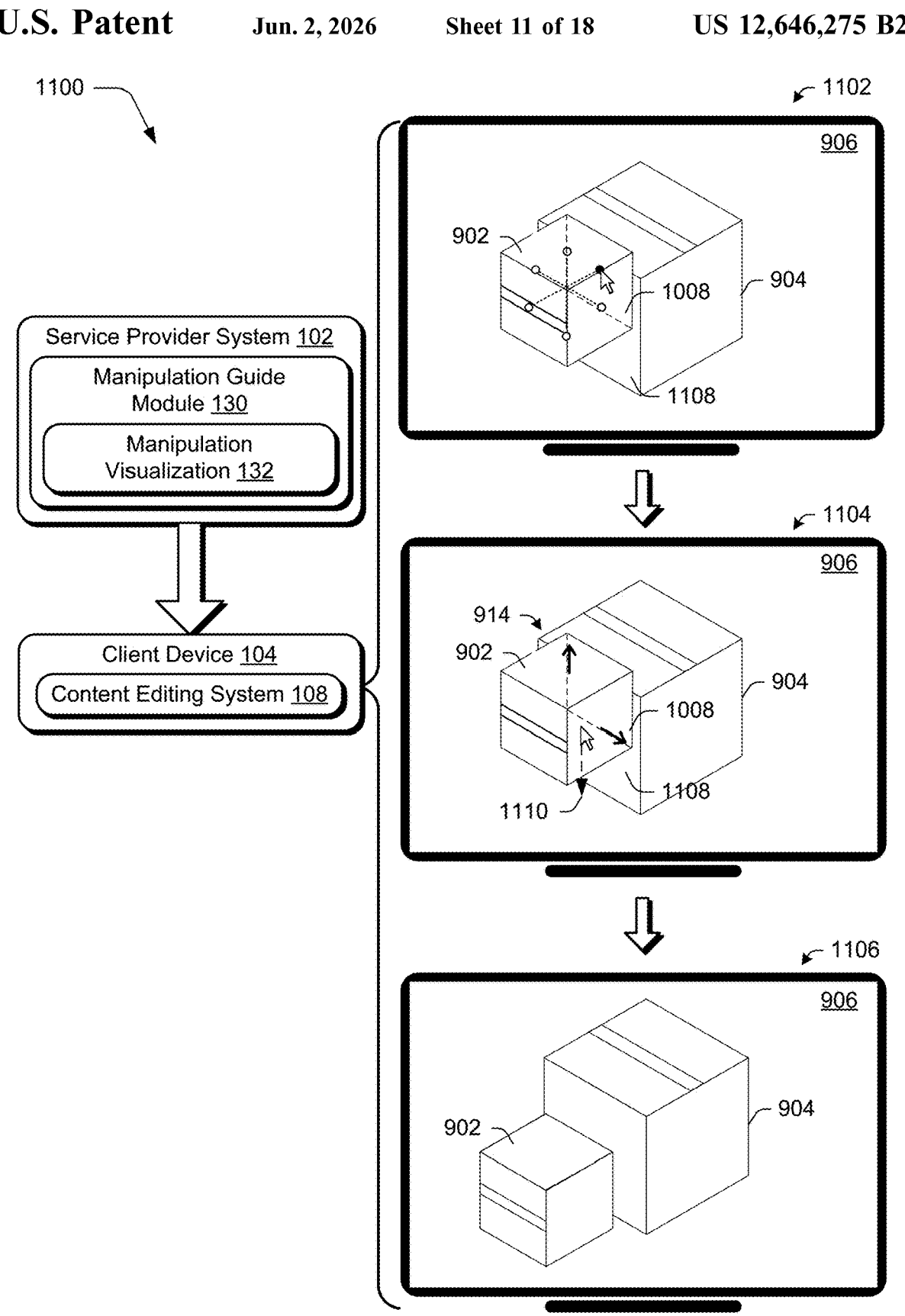
FIG. 11 depicts a system in an example implementation showing operation of a manipulation guide as implemented as an option guide to guide supported movement of three-dimensional objects in relation to each other within a three-dimensional environment.

FIG. 9 depicts a system 900 in an example implementation showing operation of a manipulation guide module and manipulation guide of FIG. 1 in greater detail. FIG. 10 depicts a system 1000 in an example implementation showing operation of a manipulation guide as implemented as an alignment guide to guide reorientation and alignment of three-dimensional objects in relation to each other. FIG. 11 depicts a system 1100 in an example implementation showing operation of a manipulation guide as implemented as an option guide to guide supported movement of three-dimensional objects in relation to each other within a three-dimensional environment. FIG. 12 is a flow diagram depicting an algorithm as a step-by-step procedure 1200 in an example implementation of operations performable for accomplishing a result of guiding movement of three-dimensional objects in relation to each other in a three-dimensional environment. The following discussion of the systems 900, 1000, and 1100 of FIGS. 9-11 is made in parallel with the procedure 1200 of FIG. 12.

The following discussion describes manipulation visualization and editing techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

In this example, the manipulation guide module 130 implements a three dimensional object control system designed to streamline three-dimensional object 124 placement with a three-dimensional environment 122. To do so, the manipulation guide module 130 implements a manipulation visualization 132 as a guide for placement of a three-dimensional object 124 within the three-dimensional environment 122 as well as placement of the three-dimensional object with respect to other three-dimensional objects.

In the illustrated example, for instance, a first three-dimensional object 902 and a second three-dimensional object 904 are displayed in a user interface 906 by a client device 104. A manipulation input 908 is generated by the content editing system 108 of the client device 104 to define movement of the first three-dimensional object 902 and a manipulation result 910 is returned by the manipulation guide module 130 depicting how the first three-dimensional object 902 is moved within the three-dimensional environment 122.

As part of this, the manipulation guide module 130 employs a manipulation visualization 132 as an aid to understanding a three-dimensional nature of the three-dimensional environment 122 as well as a relationship of the first and second three-dimensional objects 902, 904 to each other. The manipulation visualization 132 is configurable in a variety of ways in support of corresponding functionality, examples of which include an alignment guide 912 and an option guide 914.

The alignment guide 912, for instance, is configurable to indicate orientation of a three-dimensional object in three dimensions. The alignment guide is also configurable to include indications of selectable portions (e.g., surfaces, edges, etc.) of the three-dimensional object. The portions, once selected, are usable to control a "snapping" behavior in which the selection portion is reoriented in the user interface to a corresponding portion of another three-dimensional object when within a threshold distance of each other. Further discussion of use of the alignment guide 912 is included with respect to FIG. 10 that depicts output and use of the alignment guide in support of automated three-dimensional object orientation.

Once reoriented, the manipulation visualization 132 is also configurable as the option guide 914 indicating one or more directions of movement that are supported by the content editing system in movement of the first three-dimensional object 902 in relation to the second three-dimensional object 904 as further described in relation to FIG. 11.

FIG. 10 is illustrated using a first stage 1002, a second stage 1004, and a third stage 1006. At the first stage 1002, the first three-dimensional object 902 and the second three-dimensional object 904 are output and subsequently displayed in a user interface (block 1202). A selection input is then received via the user interface 906 as selecting the first three-dimensional object 902 (block 1204). In the depicted example, the selection input is positioned in the user interface 906 through control of a cursor by a cursor control device as a hover "over" the first three-dimensional object 902. Other examples are also contemplated, including use of a gesture, spoken utterance, and so forth.

In response as shown at the second stage 1004, the manipulation guide module 130 causes output of the manipulation visualization 132 as an alignment guide 912 for display in relation to the first three-dimensional object 902 in the user interface 906 (block 1206). The alignment guide 912 indicates orientation of the first three-dimensional object 902 in three-dimensional space. To do so, the alignment guide 912 includes axis corresponding to a length (i.e., longitudinal), width (i.e., latitudinal), and height of the first three-dimensional object 902.

Ends of each of the axes of the alignment guide 912 correspond to respective surfaces of the first three-dimensional object 902. The ends include indications (e.g., depicts as circles) corresponding to the surfaces that are user selectable to indicate a respective surface of the first three-dimensional object 902 that is to be used as a basis to control movement of the first three-dimensional object 902 in the three-dimensional environment 122.

As shown at the third stage 1006, for instance, an input is generated with respect to the alignment guide 912 as involving selection and movement of a respective portion 1008 of the first three-dimensional object 902 (block 1208). The portion 1008 in a first orientation of the first three-dimensional object 902 in the third stage 1006 is disposed as a "bottom surface." Selection of the indication in the example illustrated at the third stage 1006 causes the manipulation guide module 130 to provide feedback as part of the manipulation visualization 132, e.g., which is "filled in" to show selection of the indication and thus the corresponding surface. Although a surface of the first three-dimensional object 902 is used as a basis for selection and alignment in this example, other portions of the first three-dimensional object 902 may also be defined, examples of which include edges, corners, points of maximum curvature, and so forth.

The indication, once selected, is then used as a basis to define movement 1010 (illustrated through a dashed line) of the respective portion 1008 and consequently the rest of the first three-dimensional object 902 within the user interface 906. The manipulation guide module 130 is configured to then guide this movement within the three-dimensional environment 122 and more particularly the second three-dimensional object 904 in this example, further discussion of which is included in the following description and shown in a corresponding figure.

FIG. 11 is also illustrated using a first stage 1102, a second stage 1104, and a third stage 1106 as continuing the example of FIG. 10. The movement 1010 as defined in relation to FIG. 10 is detected by the manipulation guide module 130 in this example as causing the respective portion 1008 of the first three-dimensional object 902 to be disposed within a threshold distance of a portion 1108 of the second three-dimensional object 904 (block 1210). The manipulation guide module 130, for instance, is configured to perform a ray hit test using ray tracing in which a ray projecting from a surface normal of the respective portion 1008 of the first three-dimensional object 902 is detected as intersecting the portion 1108 of the second three-dimensional object 904 within the three-dimensional environment 122.

Accordingly, as illustrated at the first stage 1102, the manipulation guide module 130 reorients the first three-dimensional object 902 in the user interface 906 in three-dimensional space, such that the respective portion 1008 of the first three-dimensional object 902 appears disposed on the portion 1108 of the second three-dimensional object 904 (block 1212). The respective portion 1008 of the first three-dimensional object 902, for instance, is reoriented as coplanar with the 1108 of the second three-dimensional object 904. This causes reorientation of the first three-dimensional object 902 from the first orientation of the first three-dimensional object 902 as shown in FIG. 10 to a second orientation as shown at the first stage 1102 of FIG. 11 that is different.

The height in a vertical axis as defined in the first orientation, for instance, is disposed as normal to a surface defined by the portion 1108 of the second three-dimensional object 904 in the second orientation. In an implementation, an animation is used to give an appearance of movement through a plurality of intermedia orientations disposed between the first and second orientations.

At the second stage 1104, the manipulation visualization 132 is configured as an option guide 914 responsive to the reorientation operation. The option guide 914 indicates one or more directions of movement supported by the first three-dimensional object 902 in relation to the portion of the second three-dimensional object (block 1214). In the illustrated example, the option guide 914 is depicted as arrows that show movement that is supported as defined as parallel to a surface of the portion 1108 of the second three-dimensional object 904 and/or the respective portion 1008 of the first three-dimensional object 902. Subsequent movement 1110 of the first three-dimensional object 902 that is then released causes placement of the first three-dimensional object 902 in the three-dimensional environment 122 as depicted at the third stage 1106.

Options are also supported by the manipulation guide module 130 to further control movement of the first three-dimensional object 902 in relation to the second three-dimensional object 904 within the three-dimensional environment 122. A plane focus and lock system, for instance, is usable to lock movement to a target plane (e.g., the portion 1108 defining a surface of the second three-dimensional object 904) to avoid issues with overlaps and intersections. A user input (e.g., a shift key) may be received which is held during movement to prevent separation of the first three-dimensional object 902 from the second three-dimensional object 904 and restrict to movement to be coplanar between the respective portion 1008 of the first three-dimensional object 902 and the portion 1108 of the second three-dimensional object 904. Thus, in this example the manipulation guide module 130 supports a three-dimensional object control system that streamlines object placement within three-dimensional environments.

Example Shadow Definition Control

Figure 13:
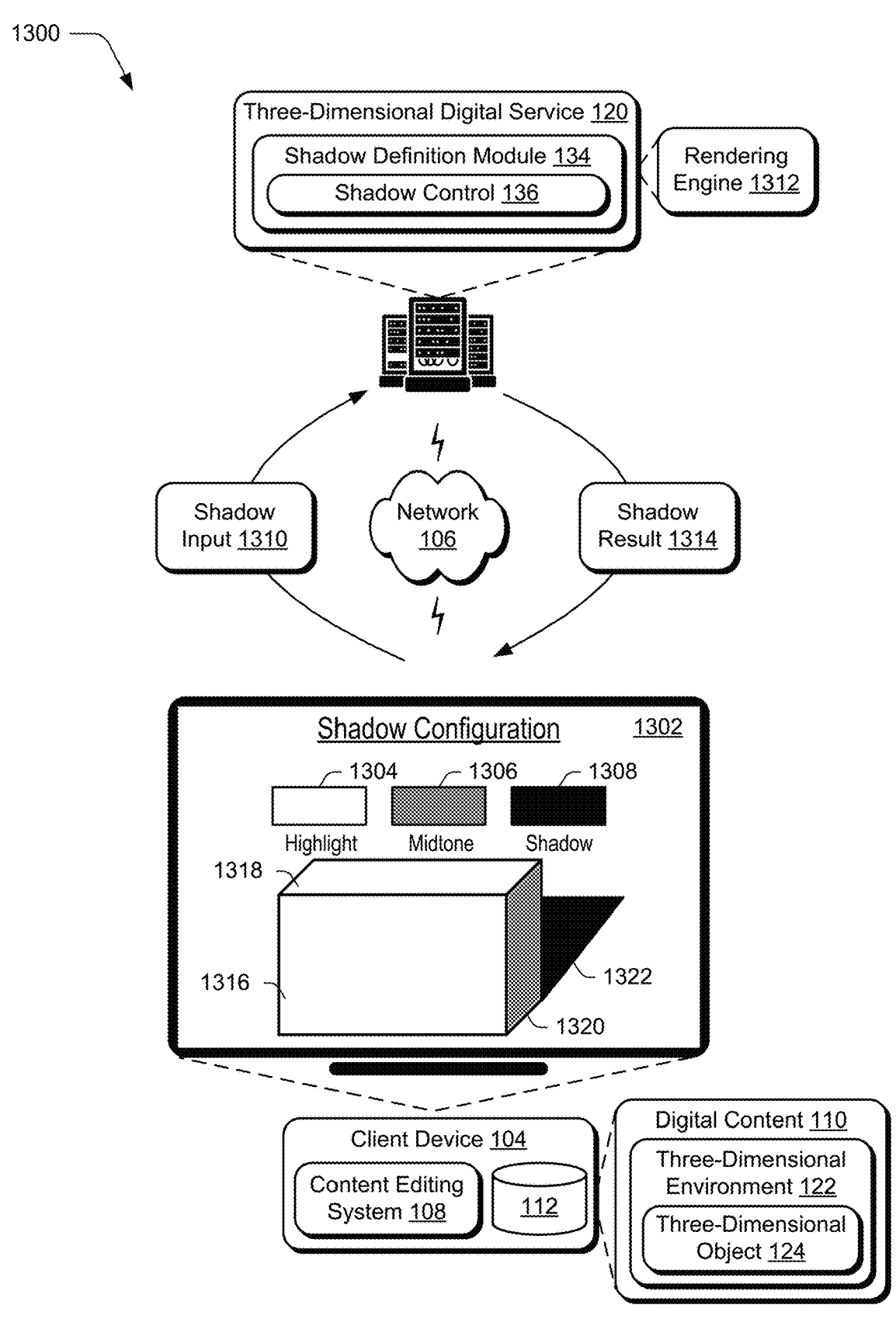
FIG. 13 depicts a system in an example implementation showing operation of shadow definition module and shadow control of FIG. 1 in greater detail.
Figure 14:
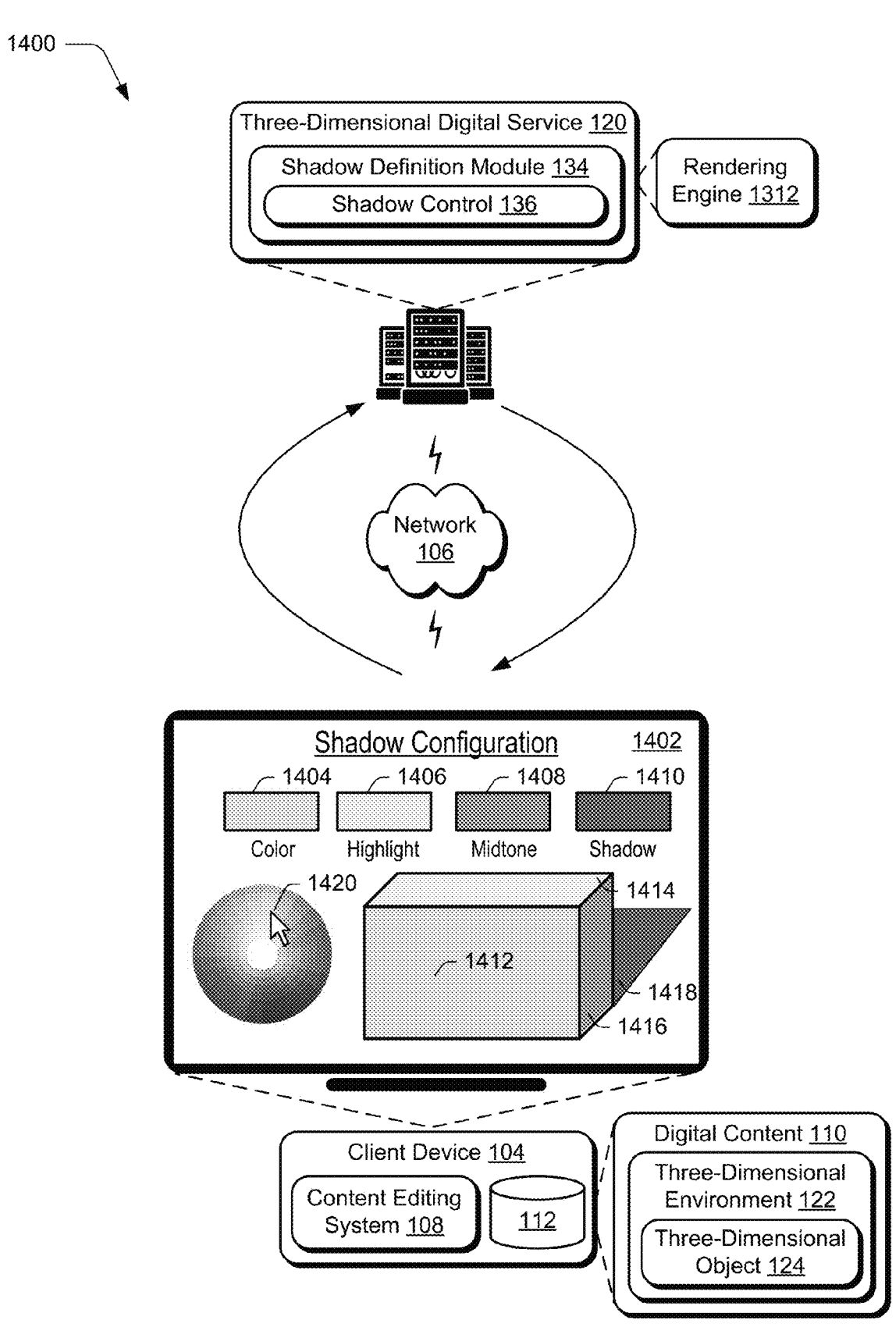
FIG. 14 depicts a system in an example implementation showing operation of shadow definition module in greater detail as setting visual characteristics for a highlight, mid-tone, and shadow using a color spectrum displayed in a user interface.
Figure 15:
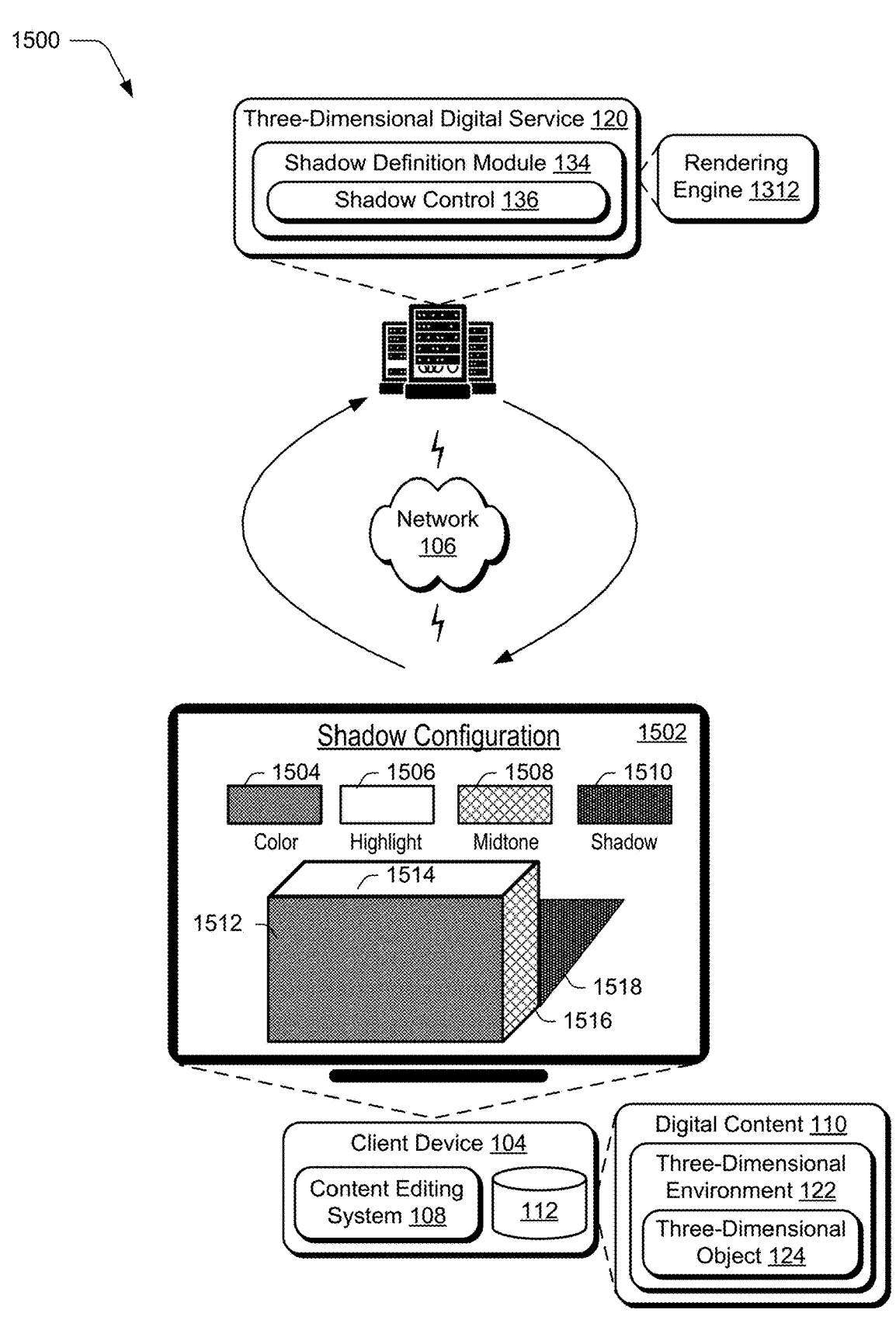
FIG. 15 depicts a system in an example implementation showing operation of shadow definition module in greater detail as setting visual characteristics for a highlight, mid-tone, and shadow using patterns.

FIG. 13 depicts a system 1300 in an example implementation showing operation of shadow definition module and shadow control of FIG. 1 in greater detail. FIG. 14 depicts a system 1400 in an example implementation showing operation of shadow definition module in greater detail as setting visual characteristics for a highlight, midtone, and shadow using a color spectrum displayed in a user interface. FIG. 15 depicts a system 1500 in an example implementation showing operation of shadow definition module in greater detail as setting visual characteristics for a highlight, midtone, and shadow using patterns.

In conventional techniques, a base color is used as a starting point to define illumination within the there-dimensional environment. Tones of the base color are then changed automatically and without intervention or user control to form a highlight, midtone, and shadow. However, these changes depart in some scenarios from a desire of a creative professional, such as to maintain a particular color for use as part of a logo.

Accordingly, the shadow definition module 134 supports user inputs received via a user interface 1302 to define visual characteristics for use when rendering the three-dimensional environment 122. The user inputs, for instance, are generated using a plurality of individually-configurable portions, examples of which include a first individually-configurable portion 1304, a second individually-configurable portion 1306, and a third individually-configurable portion 1308. The plurality of individually-configurable portions are displayed in the user interface concurrently with the three-dimensional object.

The first individually-configurable portion 1304 is configured to specify a visual characteristic to be used as a highlight as part of illuminating the three-dimensional environment 122. The second individually-configurable portion 1306 is configured to specify a visual characteristic to be used as a midtone as part of illuminating the three-dimensional environment 122. The third individually-configurable portion 1308 is configured to specify a visual characteristic that is to be used as a shadow as part of illuminated the three-dimensional environment 122.

The shadow definition module 134 receives the user inputs as a shadow input 1310 at the three-dimensional digital service 120 in this example. A rendering engine 1312 is then used to render the three-dimensional environment 122, which includes defining light transport by illuminating three-dimensional objects within the three-dimensional environment 122 based on a position of a light source, intensity of the light source, and so on. A shadow result 1314 is then output for display in the user interface 1302.

An initial surface 1316 of the three-dimensional object 124, for instance, is rendered in a base color in the illustrated example of FIG. 13. A first surface 1318 of the three-dimensional object 124 that intersects light from a light source has a visual characteristic applied that is specified for a highlight as input via the first individually-configurable portion 1304. A second surface 1320 of the three-dimensional object 124 that is partially lit by the light source has a visual characteristic applied that is specified for a midtone as input via the second individually-configurable portion 1306. A third portion 1322 of the three-dimensional environment 122 defined for a shadow of the three-dimensional object 124 has a visual characteristic applied that is specified for a shadow as input via the third individually-configurable portion 1308. In this way, direct control is supported in how illumination is rendered within the three-dimensional environment 122, which is not possible in conventional techniques.

As shown another example in FIG. 14, for instance, a user interface 1402 is output that includes a plurality of individually-configurable portions 1404, 1406, 1408, 1410 to specify a base color, highlight, midtone, and shadow, respectively. To do so, a color spectrum 1420 (e.g., as a color wheel) is displayed to select colors to be used. Selection of a base color, for instance, is usable to specify initial colors for the highlight, midtone, and shadow. The initial colors are then further modifiable to adjust colors through individual interaction with respective individually-configurable portions 1404-1410.

The rendering engine 1312 of the three-dimensional digital service 120 then utilizes the specified colors for application to corresponding portions of the three-dimensional environment 122. In the illustrated example, a base color is used for a first surface 1412 of the three-dimensional object 124, a highlight for a second surface 1414 of the three-dimensional object 124, a midtone for a third surface 1416 of the three-dimensional object 124, and a shadow for a shadow cast 1418 by the three-dimensional object 124 in the three-dimensional environment 122 as previously described. The shadow definition module 134 and shadow control 136 are also configurable to employ other visual characteristics beyond color, such as visual patterns, an example of which is described in the following discussion and shown in a corresponding figure.

As shown another example in FIG. 15, a user interface 1502 is also output that includes a plurality of individually-configurable portions 1504, 1506, 1508, 1510 to specify a base color, highlight, midtone, and shadow, respectively. In this example, rather than select colors using these portions, patterns are specified for a color, highlight, midtone, and shadow. The rendering engine 1312 of the three-dimensional digital service 120 then utilizes the specified patterns for application to corresponding portions of the three-dimensional environment 122.

In the illustrated example, a first pattern specified for the base color is used for a first surface 1512 of the three-dimensional object 124, a second pattern specified for a highlight is used for a second surface 1514 of the three-dimensional object 124, a third pattern specified for a midtone is used for a third surface 1516 of the three-dimensional object 124, and a fourth pattern specified for a shadow is used for a shadow 1518 cast by the three-dimensional object 124 in the three-dimensional environment 122. Other examples are also contemplated for visual characteristics, such as gradients.

FIG. 16 is a flow diagram depicting an algorithm as a step-by-step procedure 1600 in an example implementation of operations performable for accomplishing a result of controlling illumination rendering in a three-dimensional environment using manually specified visual characteristics. To begin in this example, a first user input is received via a user interface 1302, 1402, 1502. The first user input specifies a first visual characteristic to be used as a highlight in illuminating a three-dimensional environment 122 (block 1602), e.g., as a color in FIG. 14, a pattern in FIG. 15, and so on.

Likewise, a second user input is received via the user interface 1302, 1402, 1502. The second input specifies a second visual characteristic to be used as a midtone in illuminating the three-dimensional environment (block 1604), e.g., as a color in FIG. 14, a pattern in FIG. 15, and so on. Additionally, a third user input is received via the user interface, 1302, 1402, 1502. The third user input specifies a third visual characteristic to be used as a shadow in illuminating the three-dimensional environment (block 1606) e.g., as a color in FIG. 14, a pattern in FIG. 15, and so on.

Rendering of the three-dimensional environment 122 is controlled (block 1608) using the rendering engine 1312 by the shadow definition module 134 based on the user inputs. The rendering includes identifying a first portion of the three-dimensional environment that is to be a subject of the highlight, a second portion of the three-dimensional environment that is to be a subject of the midtone, and a third portion of the three-dimensional environment that is to be a subject of the shadow (block 1610). The three-dimensional environment 122 is illuminated (e.g., using illumination techniques such as ray tracing) by applying the first visual characteristic to the first portion of the three-dimensional environment, the second visual characteristic to the second portion of the three-dimensional environment, and the third visual characteristic to the third portion of the three-dimensional environment (block 1612).

FIG. 17 is a flow diagram depicting an algorithm as a step-by-step procedure 1700 in an example implementation of operations performable for accomplishing a result of controlling illumination and rendering in a three-dimensional environment using manual inputs specifying at least two colors. To begin in this example, user inputs are received via a user interface 1402 specifying at least two colors (block 1702). A three-dimensional object 124 in a three-dimensional environment 122 that is displayable in a user interface is illuminated through execution of a rendering engine 1312 using the at least two colors, respectively, as a highlight, a midtone, or a shadow (block 1704). For example, a first one of the colors is used as the highlight, the midtone, or the shadow and another one of the colors is used as another one of the highlight, the midtone, or the shadow.

The three-dimensional environment 122 is output by the three-dimensional digital service 120 as rendered through execution of a rendering engine 1312 (block 1706). The three-dimensional environment includes a three-dimensional object as having a first color that is user specified for a highlight associated with a first surface of the three-dimensional object based on a position of a light source defined in relation to the three-dimensional environment (block 1708). The three-dimensional object 124 also has a second color that is user specified for a midtone associated with a second surface of the three-dimensional object based on the position of the light source defined in relation to the three-dimensional environment (block 1710). The three-dimensional object 124 further includes a third color that is user specified for a shadow cast by the three-dimensional object 124 based on the position of the light source defined in relation to the three-dimensional environment 122 (block 1712).

Subsequent edits may then be made to the three-dimensional environment (e.g., to reposition a light source), which continue use of the specified visual characteristics as part of re-rendering the three-dimensional environment 122 such that these characteristics remain unchanged, thereby improving user and computation efficiency. In this way, direct control is supported in how illumination is implemented as part of rendering the three-dimensional environment, which is not possible in conventional techniques.

Example System and Device

Figure 18:
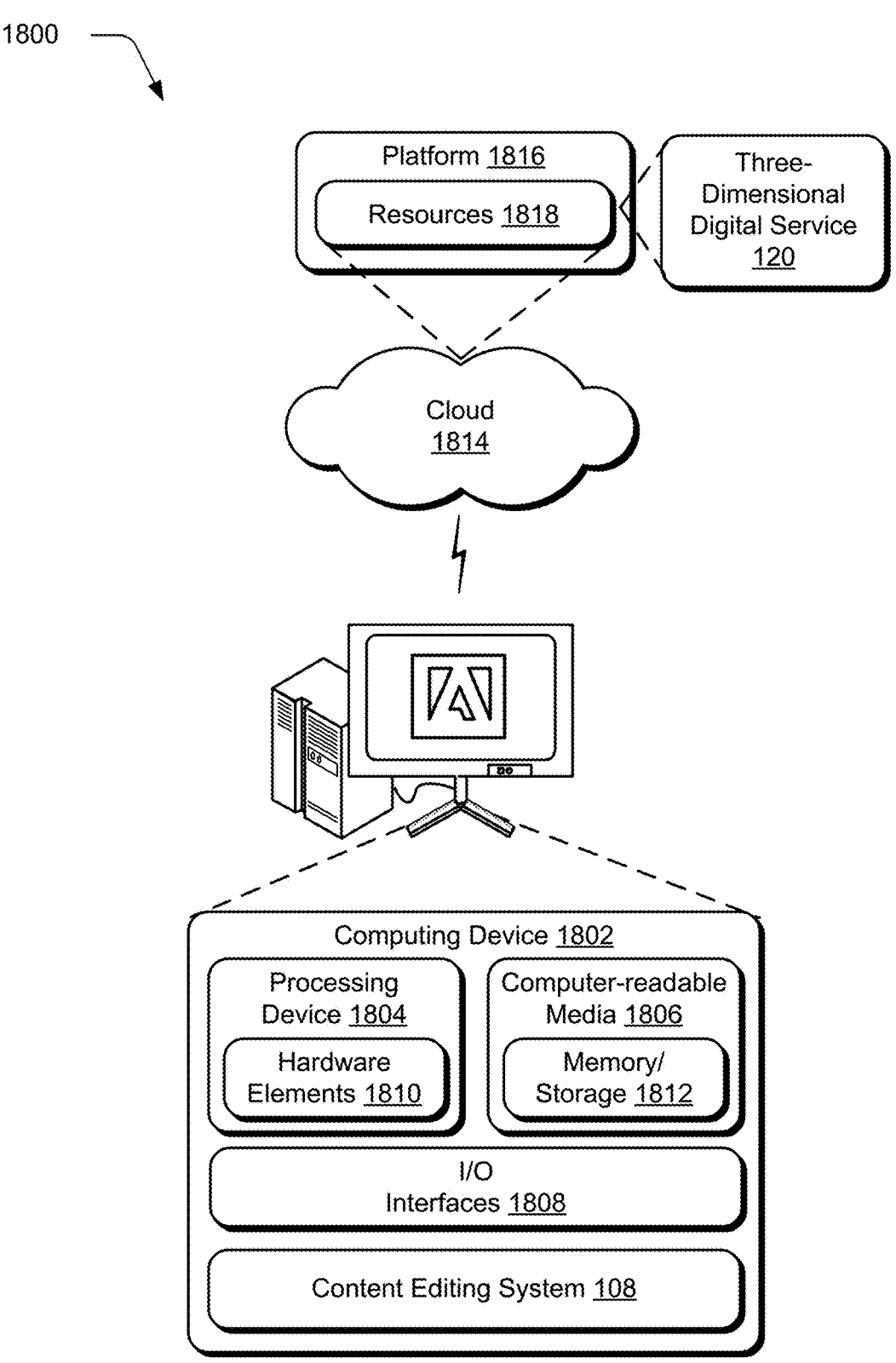
FIG. 18 illustrates an example system including various components of an example device that can be implemented as any type of computing device as described and/or utilize with reference to FIGS. 1-17 to implement embodiments of the techniques described herein.

FIG. 18 illustrates an example system generally at 1800 that includes an example computing device 1802 that is representative of one or more computing systems and/or devices that implement the various techniques described herein. This is illustrated through inclusion of the content editing system 108 and three-dimensional digital service 120. The computing device 1802 is configurable, for example, as a server of a service provider, a device associated with a client (e.g., a client device), an on-chip system, and/or any other suitable computing device or computing system.

The example computing device 1802 as illustrated includes a processing device 1804, one or more computer-readable media 1806, and one or more I/O interface 1808 that are communicatively coupled, one to another. Although not shown, the computing device 1802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1804 is representative of functionality to perform one or more operations using hardware. Accordingly, the processing device 1804 is illustrated as including hardware element 1810 that is configurable as processors, functional blocks, and so forth. This includes implementation in hardware as an application specific integrated circuit or other logic device formed using one or more semiconductors. The hardware elements 1810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1806 is illustrated as including memory/storage 1812 that stores instructions that are executable to cause the processing device 1804 to perform operations. The memory/storage 1812 represents memory/storage capacity associated with one or more computer-readable media. The memory/storage 1812 includes volatile media (such as random access memory (RAM)) and/or nonvolatile media (such as read only memory (ROM), Flash memory, optical disks, magnetic disks, and so forth). The memory/storage 1812 includes fixed media (e.g., RAM, ROM, a fixed hard drive, and so on) as well as removable media (e.g., Flash memory, a removable hard drive, an optical disc, and so forth). The computer-readable media 1806 is configurable in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1810. The computing device 1802 is configured to implement particular instructions and/or functions corresponding to the software and/or hardware modules. Accordingly, implementation of a module that is executable by the computing device 1802 as software is achieved at least partially in hardware, e.g., through use of computer-readable storage media and/or hardware elements 1810 of the processing device 1804. The instructions and/or functions are executable/operable by one or more articles of manufacture (for example, one or more computing devices 1802 and/or processing devices 1804) to implement techniques, modules, and examples described herein.

The techniques described herein are supported by various configurations of the computing device 1802 and are not limited to the specific examples of the techniques described herein. This functionality is also implementable all or in part through use of a distributed system, such as over a "cloud" 1814 via a platform 1816 as described below.

The cloud 1814 includes and/or is representative of a platform 1816 for resources 1818. The platform 1816 abstracts underlying functionality of hardware (e.g., servers) and software resources of the cloud 1814. The resources 1818 include applications and/or data that can be utilized while computer processing is executed on servers that are remote from the computing device 1802. Resources 1818 can also include services provided over the Internet and/or through a subscriber network, such as a cellular or Wi-Fi network.

The platform 1816 abstracts resources and functions to connect the computing device 1802 with other computing devices. The platform 1816 also serves to abstract scaling of resources to provide a corresponding level of scale to encountered demand for the resources 1818 that are implemented via the platform 1816. Accordingly, in an interconnected device embodiment, implementation of functionality described herein is distributable throughout the system 1800. For example, the functionality is implementable in part on the computing device 1802 as well as via the platform 1816 that abstracts the functionality of the cloud 1814.

In implementations, the platform 1816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   outputting, by a processing device, an alignment guide for display in relation to a first three-dimensional object in a user interface;
   receiving, by the processing device, an input generated with respect to the alignment guide as involving selection and movement of a respective portion of the first three-dimensional object;
   detecting, by the processing device, the input causes the respective portion of the first three-dimensional object to be disposed within a threshold distance of a portion of a second three-dimensional object; and reorienting, by the processing device responsive to the detecting, an axis of the first three-dimensional object in the user interface in three-dimensional space such that the axis of the first three-dimensional object appears disposed as normal to a surface defined by the portion of the second three-dimensional object.

2. The method as described in claim 1, wherein the respective portion of the first three-dimensional object is a first surface and the portion of the second three-dimensional object is a second surface and wherein the reorienting causes the first and second surfaces to be coplanar, one to another.

3. The method as described in claim 1, wherein the alignment guide is configured to indicate a plurality of axis defined in relation to the first three-dimensional object.

4. The method as described in claim 1, wherein the alignment guide includes an orientation of the first three-dimensional object in three-dimensional space.

5. The method as described in claim 1, wherein the alignment guide includes a plurality of indications corresponding to a plurality of surfaces defined in relation to the first three-dimensional object.

6. The method as described in claim 5, wherein the input generated with respect to the alignment guide involves selection of a respective said indication.

7. The method as described in claim 1, wherein the detecting is performed using a ray hit test using ray tracing.

8. The method as described in claim 1, further comprising:
   outputting, by a processing device, the first three-dimensional object and the second three-dimensional object for display in a user interface;
   receiving, by the processing device, a selection input selecting the first three-dimensional object, and wherein the outputting the alignment guide for display in relation to the first three-dimensional object in the user interface is performed responsive to the receiving of the selection input.

9. The method as described in claim 8, wherein:
   the outputting the first three-dimensional object for display in the user interface is performed using a first orientation of the first three-dimensional object; and
   the reorienting includes movement of the first three-dimensional object into a second orientation that is different from the first orientation.

10. The method as described in claim 9, wherein the movement is generated using an animation that gives an appearance of the movement of the first three-dimensional object from the first orientation to the second orientation.

11. The method as described in claim 1, further comprising outputting, by the processing device responsive to the reorienting, an option guide indicating one or more directions of movement supported by the first three-dimensional object in relation to the portion of the second three-dimensional object.

12. The method as described in claim 11, wherein the one or more directions include at least one direction occurs along a plane that corresponds with the respective portion of the first three-dimensional object or the portion of the second three-dimensional object.

13. A computing device comprising:
   a processing device; and
   a computer-readable storage medium storing instructions that, responsive to execution by a processing device, causes the processing device to perform operations including:
      outputting a first three-dimensional object and a second three-dimensional object for display in a user interface, the first three-dimensional object displayed in a first orientation in three-dimensional space;

detecting an input causes movement of the first three-dimensional object to be disposed within a threshold distance from a second three-dimensional object;

reorienting, responsive to the detecting for display in the user interface, the first three-dimensional object from the first orientation to a second orientation in the three-dimensional space such that a surface of the first three-dimensional object appears disposed on a surface of the second three-dimensional object; and outputting, responsive to the reorienting, an option guide indicating one or more directions of movement supported by the first three-dimensional object in relation to the surface of the second three-dimensional object.

14. The computing device as described in claim 13, wherein the detecting is performed using a ray hit test using ray tracing.

15. The computing device as described in claim 13, wherein the reorienting causes a change from the first orientation to the second orientation in three axes.

16. The computing device as described in claim 13, further comprising outputting an alignment guide for display in relation to the first three-dimensional object in the user interface and wherein the input involves selection of the alignment guide.

17. One or more computer-readable storage media storing instructions that, responsive to execution by a processing device, causes the processing device to perform operations including:

detecting an input causes movement of a first three-dimensional object in a user interface to be disposed within a threshold distance from a second three-dimensional object;

reorienting the first three-dimensional object from a first orientation to a second orientation in three-dimensional space responsive to the detecting; and outputting an option guide indicating one or more directions of movement supported by the first three-dimensional object in relation to a second three-dimensional object in the user interface.

18. The one or more computer-readable storage media as described in claim 17, wherein the operations further comprise:

outputting an alignment guide for display in relation to the first three-dimensional object in the user interface and wherein the input involves selection of the alignment guide; and receiving the input as generated with respect to the alignment guide as involving selection and movement the first three-dimensional object.

19. The one or more computer-readable storage media as described in claim 17, wherein the reorienting causes a change in three axes.

20. The one or more computer-readable storage media as described in claim 17, wherein the reorienting causes a surface of the first three-dimensional object and a surface of the second three-dimensional object to be coplanar, one to another.

* * * * *